(12) United States Patent
Tsotsis et al.

(10) Patent No.: US 10,814,566 B2
(45) Date of Patent: Oct. 27, 2020

(54) STIFFENED PANELS

(71) Applicant: The Boeing Company, Chicago, IL (US)

(72) Inventors: Thomas Karl Tsotsis, Santa Ana, CA (US); Roscoe C. Litchard, III, Orange, CA (US)

(73) Assignee: The Boeing Company, Chicago, IL (US)

( * ) Notice: Subject to any disclaimer, the term of this patent is extended or adjusted under 35 U.S.C. 154(b) by 91 days.

(21) Appl. No.: 15/702,142

(22) Filed: Sep. 12, 2017

(65) Prior Publication Data
US 2019/0077093 A1    Mar. 14, 2019

(51) Int. Cl.
| | | |
|---|---|---|
| *B29C 70/34* | (2006.01) | |
| *B29C 33/48* | (2006.01) | |
| *B29C 70/24* | (2006.01) | |
| *E04C 2/36* | (2006.01) | |
| *B29C 43/14* | (2006.01) | |
| *B32B 7/14* | (2006.01) | |
| *B29D 99/00* | (2010.01) | |
| *B32B 3/12* | (2006.01) | |

(Continued)

(52) U.S. Cl.
CPC ............ *B29C 70/34* (2013.01); *B29C 33/485* (2013.01); *B29C 43/146* (2013.01); *B29C 70/24* (2013.01); *B29D 99/0021* (2013.01); *B32B 3/12* (2013.01); *B32B 7/14* (2013.01); *E04C 2/36* (2013.01); *B29C 70/70* (2013.01); *B29C 2043/147* (2013.01); *B29C 2043/148* (2013.01); *B29D 99/0014* (2013.01); *B29L 2031/3076* (2013.01); *B29L 2031/3082* (2013.01); *B29L 2031/608* (2013.01); *B32B 27/06* (2013.01)

(58) Field of Classification Search
CPC ..................................................... B29C 70/34
See application file for complete search history.

(56) References Cited

U.S. PATENT DOCUMENTS

| | | | |
|---|---|---|---|
| 6,553,734 B1 | 4/2003 | McKague, Jr. et al. | |
| 6,649,006 B2 * | 11/2003 | Benson | B29C 53/24 156/245 |

(Continued)

FOREIGN PATENT DOCUMENTS

| | | | | |
|---|---|---|---|---|
| DE | 102004002276 A1 * | 9/2005 | ............ | B21D 53/88 |
| DE | 102004002276 A1 | 9/2005 | | |

(Continued)

OTHER PUBLICATIONS

European Patent Office Extended Search Report, dated Jan. 24, 2019, regarding Application No. 18189226.6, 8 pages.

(Continued)

*Primary Examiner* — Daniel H Lee
(74) *Attorney, Agent, or Firm* — Yee & Associates, P.C.

(57) ABSTRACT

A method for fabricating a stiffened panel. Layers of composite material are placed on a surface of an inner-mold-line tool having protrusions that extend from the surface of the inner-mold-line tool. The layers of composite material laid-up on the surface of the inner-mold-line tool are compacted to form compacted layers of composite material. The compacted layers of composite material are cured to form an inner-mold-line layer having corresponding protrusions. The inner-mold-line layer is joined to an outer-mold-line layer.

20 Claims, 22 Drawing Sheets

(51) Int. Cl.
   *B32B 27/06* (2006.01)
   *B29C 70/70* (2006.01)
   *B29L 31/30* (2006.01)
   *B29L 31/60* (2006.01)

(56) References Cited

U.S. PATENT DOCUMENTS

| | | | |
|---|---|---|---|
| 6,849,323 B2 | 2/2005 | Benson et al. | |
| 2005/0257887 A1* | 11/2005 | Tsotsis | B29B 11/16 156/308.2 |
| 2009/0072429 A1 | 3/2009 | Ashton et al. | |
| 2016/0167336 A1* | 6/2016 | Shuert | B32B 7/05 428/178 |

FOREIGN PATENT DOCUMENTS

| | | | | |
|---|---|---|---|---|
| DE | 102009053053 A1 * | 5/2011 | ......... | B29D 99/0014 |
| DE | 102009053053 A1 | 5/2011 | | |

OTHER PUBLICATIONS

European Patent Office Communication, dated Apr. 20, 2020, regarding Application No. 18189226.6, 4 pages.

\* cited by examiner

STIFFENED PANELS

BACKGROUND INFORMATION

1. Field

The present disclosure relates generally to manufacturing composite structures and, in particular, to manufacturing stiffened panels.

2. Background

Aircraft are being designed and manufactured with greater and greater percentages of composite materials. Composite materials are used in aircraft to decrease the weight of the aircraft. This decreased weight improves performance features such as increased payload capacities and greater fuel efficiencies. Further, composite materials provide longer service life for various components in an aircraft.

Composite materials are tough, lightweight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

Composite panels, in the form of sandwich structures, are often used. These panels have a honeycomb or foam core between two facesheets. This configuration reduces the weight of the panel while providing a high specific strength.

Manufacturing these sandwich structures may be more difficult than desired. For example, adhesion of facesheets to the honeycomb core may be difficult to perform due to core cleaning, inconsistencies in core fabrication caused by milling and hand sanding. This introduces variability into the bonding process that sometimes results in disbonds or worse yet a false indication of a bond that later fails in service. Non-Destructive inspection of honeycomb structures is time consuming when compared to traditional solid laminates.

When comprised of paper, such as Nomex, a honeycomb core may absorb water and freeze. Additionally, disbonding may occur with the use of paper honeycomb cores. With the use of aluminum, this kind of core may corrode during use.

Further, the honeycomb cores may be more expensive than desired. As another example, foam cores are hygroscopic and are dimensionally unstable.

Additionally, these types of sandwich structures typically have very thin facesheets. Thinness of these facesheets make the facesheets prone to surface damage and expensive to repair.

Therefore, it would be desirable to have a method and apparatus that take into account at least some of the issues discussed above, as well as other possible issues. For example, it would be desirable to have a method and apparatus that overcome a technical problem with forming stiffened-panel sandwich structures.

SUMMARY

An embodiment of the present disclosure provides a method for fabricating a stiffened panel. Layers of composite material are placed on a surface of an inner-mold-line tool having protrusions that extend from the surface of the inner-mold-line tool. The layers of composite material laid-up on the surface of the inner-mold-line tool are compacted to form compacted layers of composite material. The compacted layers of composite material are cured to form an inner-mold-line layer having corresponding protrusions. The inner-mold-line layer is joined to an outer-mold-line layer.

Another embodiment of the present disclosure provides a method for manufacturing a stiffened thermoplastic panel. An inner-mold-line skin is compression-formed from a thermoplastic composite material having ridges and valleys. An outer-mold-line skin is compression-formed from the thermoplastic composite material. The outer-mold-line skin is substantially smooth. The inner-mold-line skin and the outer-mold-line skin are melt-bonded together.

Yet another embodiment of the present disclosure provides a manufacturing system for forming a stiffened panel. The manufacturing system comprises a control system in the manufacturing system. The control system is configured to control the manufacturing system to place layers of composite material on a surface of an inner-mold-line tool having protrusions that extend from the surface of the inner-mold-line tool. The controller system compacts the layers of composite material laid-up on the surface of the inner-mold-line tool to form compacted layers of composite material. The controller system cures the compacted layers of composite material to form an inner-mold-line layer having corresponding protrusions. The controller system bonds the inner-mold-line layer to an outer-mold-line layer.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that stiffened panels may be manufactured using configurations other than a sandwich panel that has a core located between two facesheets. For example, the illustrative embodiments recognize and take into account that a hollow composite structure may be used to provide a desired level of weight and strength for a panel without using a honeycomb or foam core.

The illustrative embodiments recognize and take into account that some manufacturing techniques involve soluble mandrels or other mandrels that are removed after processing. The illustrative embodiments recognize and take into account that the use of soluble mandrels or other types of removable mandrels require access to those sections containing the mandrels from outside of the structure to enable their removal.

The illustrative embodiments also recognize and take into account that a stiffened panel may be manufactured using operations that avoid employing mandrels that are removed after forming the panel. The illustrative embodiments provide a method and apparatus for manufacturing a stiffened composite panel. A first layer of composite material may be shaped to have protrusions extending from a surface of the first layer. This first layer may be cured and then bonded to a second layer. Bonding of these two layers forms a panel that is stiffened. Further, the shape of the first layer may be selected to provide a desired level of strength in a number of directions. As used herein, "a number of," when used with reference to items, means one or more items. For example, "a number of directions" is one or more directions.

Figure 1:
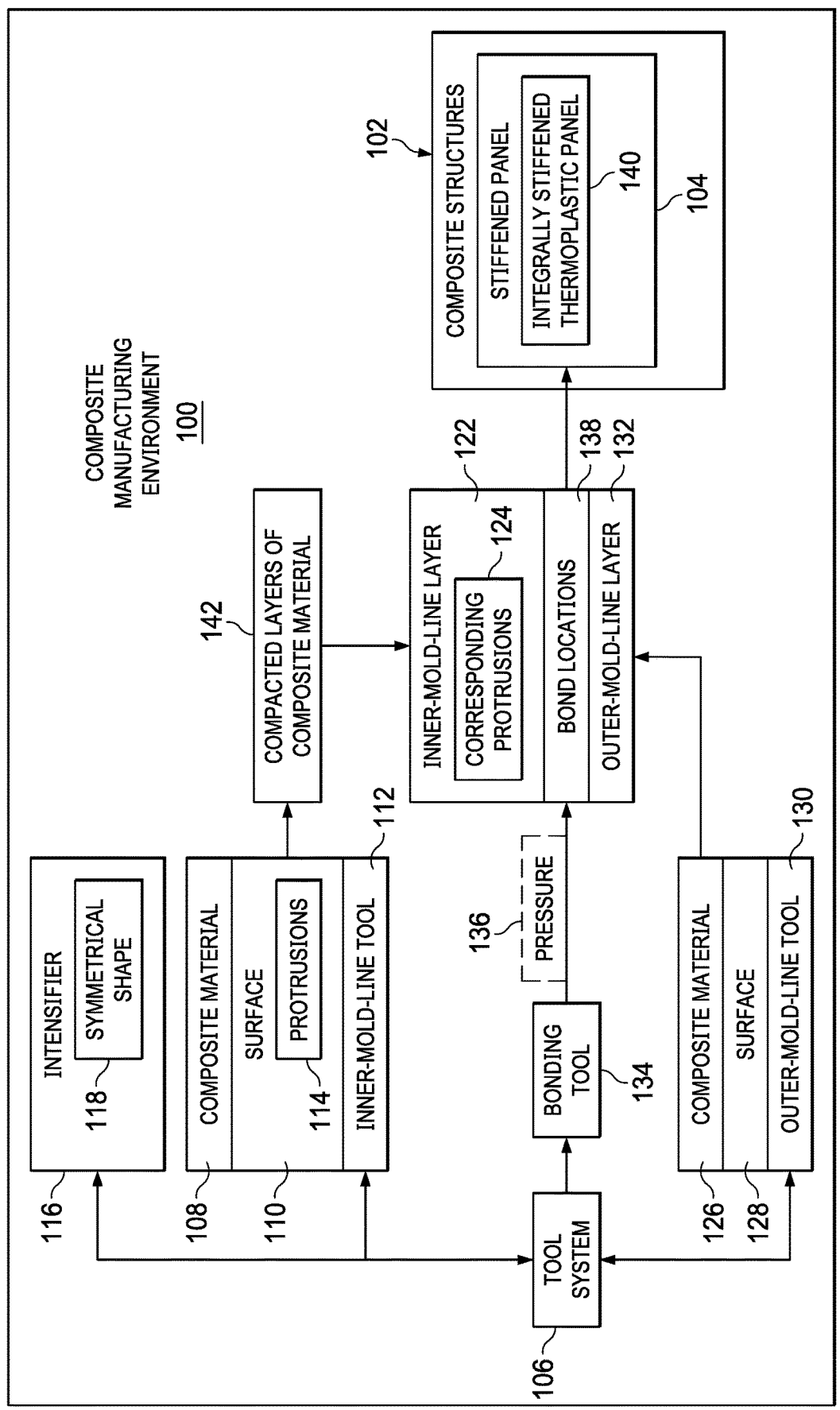
FIG. 1 is an illustration of a block diagram of a composite manufacturing environment in accordance with an illustrative embodiment.

With reference now to the figures and, in particular, with reference to FIG. 1, an illustration of a block diagram of a composite manufacturing environment is depicted in accordance with an illustrative embodiment. In this illustrative example, composite manufacturing environment 100 may be used to manufacture composite structures 102 including stiffened panel 104. Stiffened panel 104 is selected from a group comprising a part in a closet, a monument in an aircraft passenger cabin, a wall, a door, a skin panel, a control surface, a floor, or some other suitable type of structure.

In this illustrative example, tool system 106 is used to manufacture composite structures 102, including stiffened panel 104. As depicted, layers of composite material 108 are placed on surface 110 of inner-mold-line tool 112 in tool system 106. In this illustrative example, inner-mold-line tool 112 has protrusions 114 extending from surface 110 of inner-mold-line tool 112. Protrusions 114 may form ridges and valleys in surface 110 of inner-mold-line tool 112. As depicted, the shape and dimensions of protrusions 114 may be selected to accommodate mating components, parts, or hardware.

Protrusions 114 also may form at least one of a pyramid, a dome, a cylinder, or some other three-dimensional form in surface 110 of inner-mold-line tool 112. Further, surface 110 of inner-mold-line tool 112 may have a shape that is at least one of planar, curved, angled, or have some other desired contour.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C; or item B and item C. Of course, any combinations of these items may be present. In some illustrative examples, "at least one of" may be, for example, without limitation, two of item A; one of item B; and ten of item C; four of item B and seven of item C; or other suitable combinations.

Layers of composite material 108 laid-up on surface 110 are compacted using intensifier 116 in tool system 106 to form compacted layers of composite material 142. In this illustrative example, intensifier 116 has symmetrical shape 118 of inner-mold-line tool 112 on which layers of composite material 108 are laid-up on inner-mold-line tool 112. In this example, intensifier 116 is a layer of flexible material used to ensure the application of sufficient and uniform pressure to a location, such as a radius, in a lay-up being compacted or cured. The flexible material is selected as a material sufficiently dimensionally stable at the processing temperature required to cure or consolidate the matrix in the composite material. Intensifier 116 is an optional component for use in compacting layers of composite material 108 laid-up on surface 110.

In this depicted example, compacted layers of composite material 142 are cured to form inner-mold-line layer 122 having corresponding protrusions 124. In other words, corresponding protrusions 124 extending from surface 128 correspond to protrusions 114 extending from surface 110.

As depicted, layers of composite material 126 are laid-up on surface 128 of outer-mold-line tool 130. In this illustrative example, surface 128 of outer-mold-line tool 130 is substantially smooth. In other words, surface 128 is substantially smooth when surface 128 is a surface free from irregularities, roughness, projections, or indentations. For example, surface 128 is substantially smooth when protrusions 114 in surface 110 are absent from surface 128 of outer-mold-line tool 130. As another example, surface 128 is substantially smooth when surface 128 is substantially planar. Surface 128 may be substantially smooth when surface 128 has a curve. Surface 128 of outer-mold-line tool 130 may be at least one of substantially planar, curved, or angled in this illustrative example.

Layers of composite material 126 are cured to form outer-mold-line layer 132. As depicted, outer-mold-line layer 132 is substantially smooth.

Inner-mold-line layer 122 and outer-mold-line layer 132 are joined to each other. The joining may be performed in a number of different ways. For example, the joining may be performed by bonding, fastening, or other suitable techniques.

In this illustrative example, the joining occurs by bonding inner-mold-line layer 122 to outer-mold-line layer 132 to form stiffened panel 104. Bonding inner-mold-line layer 122 to outer-mold-line layer 132 to form stiffened panel 104 may be performed using bonding tool 134 that applies pressure 136 at bond locations 138 between inner-mold-line layer 122 and outer-mold-line layer 132.

The bonding may be performed in a number of different ways. For example, bonding may be performed through melt-bonding of inner-mold-line layer 122 to outer-mold-line layer 132 to form stiffened panel 104. In another illustrative example, bonding may be performed by bonding inner-mold-line layer 122 to outer-mold-line layer 132 using an adhesive to form stiffened panel 104.

Layers of composite material 108 and layers of composite material 126 may take a number of different forms. For example, composite material 108 and composite material 126 may be selected from at least one of a tape, a fabric, a prepreg, or a thermoplastic material. For example, composite material 108 and composite material 126 may include a thermoplastic resin. In this manner, stiffened panel 104 may be integrally stiffened thermoplastic panel 140. The thermoplastic material, before being formed into a panel, may be comprised of preconsolidated thermoplastic prepreg layers or fabrics comprising a mixture of structural and thermoplastic fibers.

In one illustrative example, one or more technical solutions are present that overcome a technical problem with forming stiffened panels using sandwich structures. As a result, one or more technical solutions may provide a technical effect providing a method and apparatus for manufacturing stiffened panels without using mandrels or other tools that may require access to the sections of the stiffened panel to enable removal of these tools.

Additionally, one or more technical solutions may provide a technical effect in which more effective bonding of components may be performed to fabricate a stiffened panel. For example, the locations at which the inner-mold-line layer and the outer-mold-line layer meet have areas that are larger than stiffened panels using honeycomb cores sandwiched between two facesheets.

The illustration of composite manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 2:
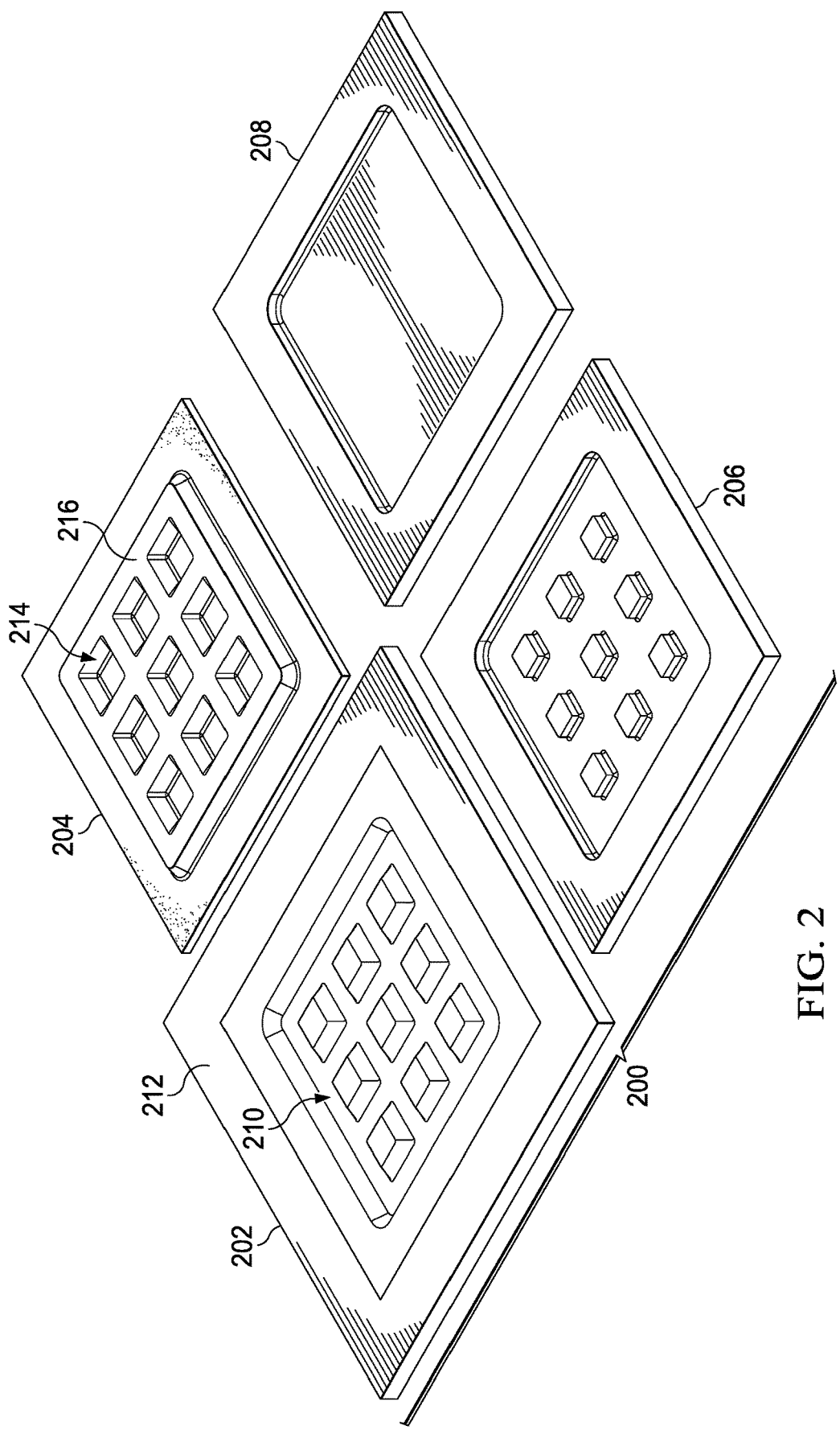
FIG. 2 is an illustration of a tool system in accordance with an illustrative embodiment.

With reference now to FIG. 2, an illustration of a tool system is depicted in accordance with an illustrative embodiment. Tool system 200 is an example of one implementation for tool system 106 shown in block form in FIG. 1.

In this illustrative example, tool system 200 includes a number of different tools. As depicted, tool system 200 includes inner-mold-line tool 202, intensifier 204, bonding tool 206, and outer-mold-line tool 208.

Inner-mold-line tool 202 is an example of one physical implementation for inner-mold-line tool 112 shown in block form in FIG. 1. Intensifier 204 is an example of a physical implementation for intensifier 116 shown in block form in FIG. 1. Bonding tool 206 is an example of a physical implementation for bonding tool 134 shown in block form in FIG. 1. Outer-mold-line tool 208 is an example of a physical implementation for outer-mold-line tool 130 shown in block form in FIG. 1.

In this illustrative example, inner-mold-line tool 202 has protrusions 210 that extend from surface 212 of inner-mold-line tool 202. Intensifier 204 has depressions 214 in surface 216 of intensifier 204. Depressions 214 in surface 216 form a symmetrical shape to inner-mold-line tool 202. For example, depressions 214 in surface 216 of intensifier 204 are designed to receive protrusions 210 from surface 212 of inner-mold-line tool 202.

With reference to FIGS. 3-12, illustrations of a process for manufacturing a stiffened panel are depicted in accordance with an illustrative embodiment. The different operations may be performed using tool system 200 in FIG. 2.

Figure 3:
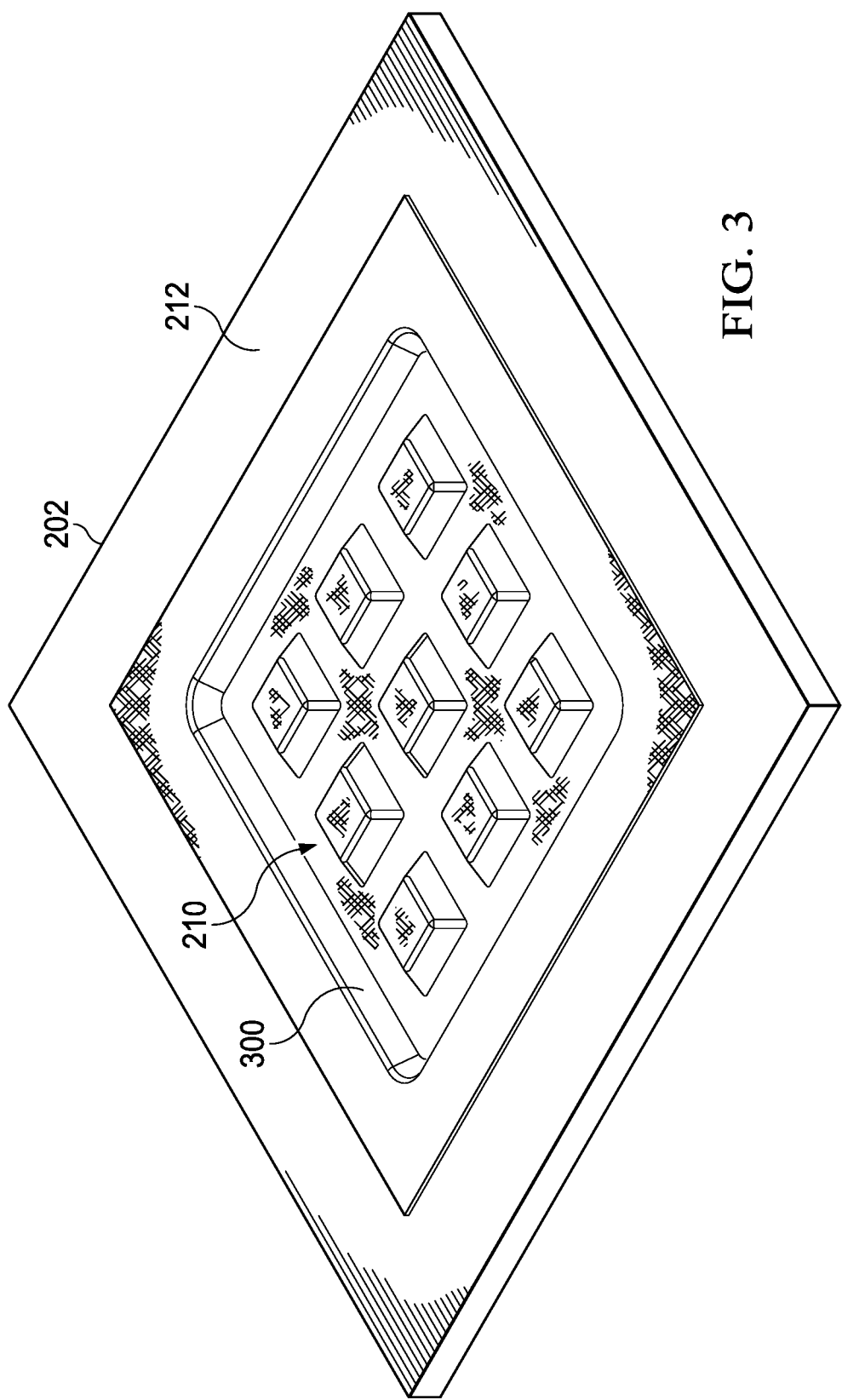
FIG. 3 is an illustration of an inner-mold-line tool with layers of composite material in accordance with an illustrative embodiment.

Turning first to FIG. 3, an illustration of an inner-mold-line tool with layers of composite material is depicted in accordance with an illustrative embodiment. In this illustrative example, layers of composite material 300 are laid-up on inner-mold-line tool 202 in this figure.

Figure 4:
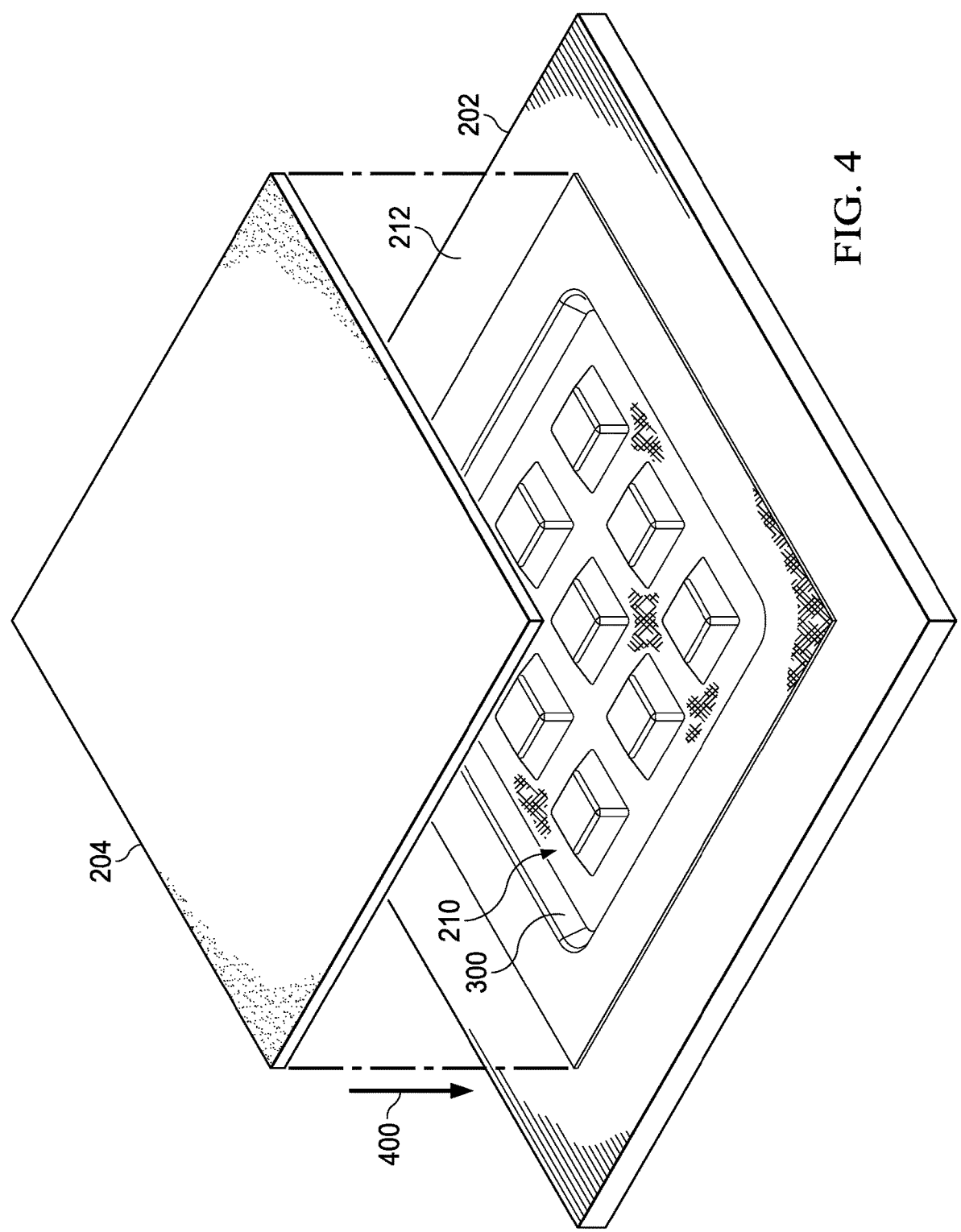
FIG. 4 is an illustration of an intensifier positioned with respect to an inner-mold-line tool in accordance with most embodiment.

With reference next to FIG. 4, an illustration of an intensifier positioned with respect to an inner-mold-line tool is depicted in accordance with an illustrative embodiment. In this figure, intensifier 204 is positioned over inner-mold-line tool 202 and layers of composite material 300 laid-up on inner-mold-line tool 202.

As depicted, depressions 214 in surface 216 (not shown) of intensifier 204 correspond to protrusions 210 from surface 212 of inner-mold-line tool 202. In other words, intensifier 204 has a symmetrical shape of inner-mold-line tool 202. Intensifier 204 may be moved in the direction of arrow 400 and placed against inner-mold-line tool 202 such that layers of composite material 300 are compacted to form compacted layers of composite material 300.

Figure 5:
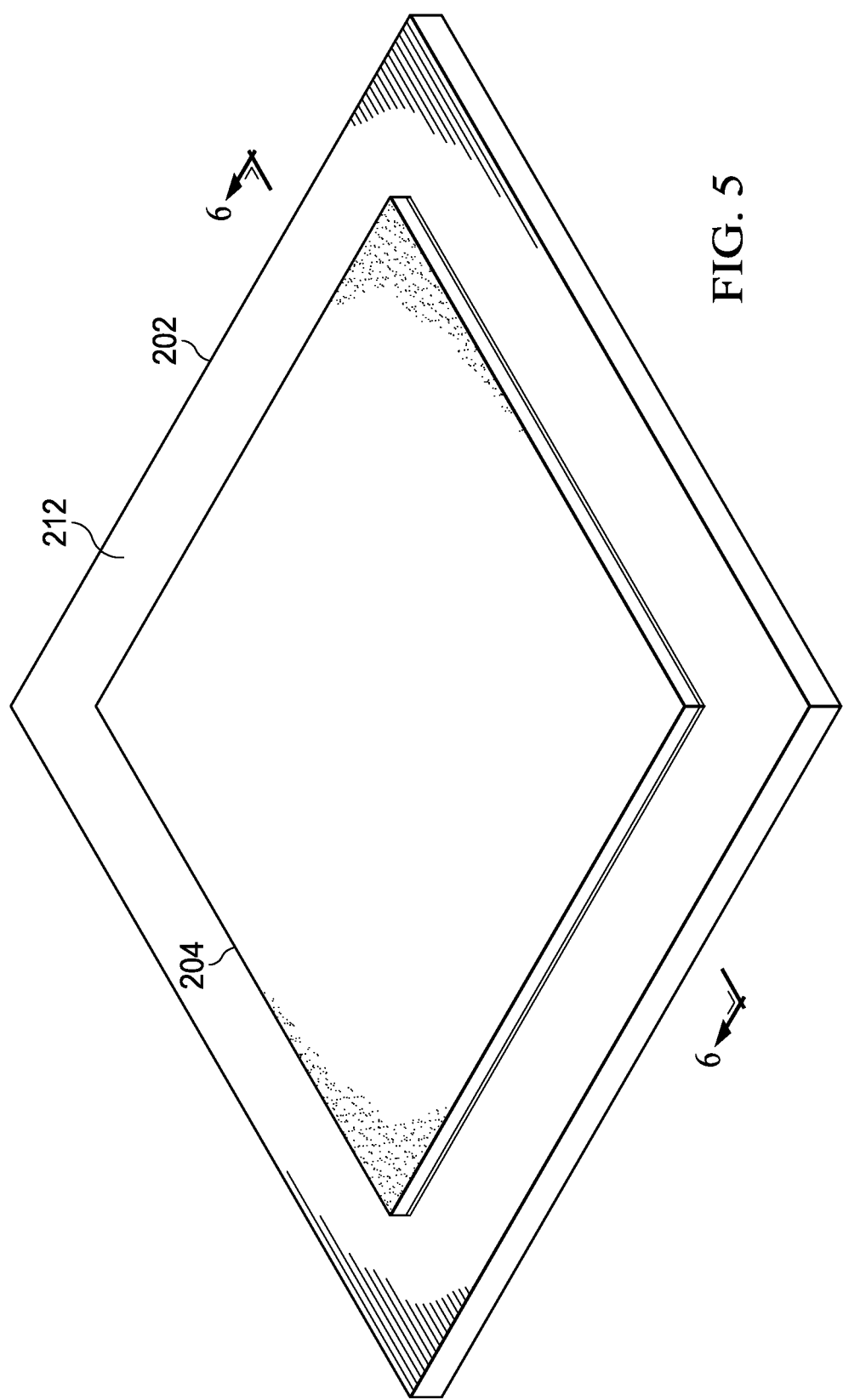
FIG. 5 is an illustration of an intensifier engaged with an inner-mold-line tool in accordance with an illustrative embodiment.

With reference now to FIG. 5, an illustration of an intensifier engaged with an inner-mold-line tool is depicted in accordance with an illustrative embodiment. As depicted in this figure, intensifier 204 is engaged with inner-mold-line tool 202. Layers of composite material 300 (not shown) are located between these two tools.

Intensifier 204 may be used to apply force on layers of composite material 300 laid-up on inner-mold-line tool 202 in a manner that compacts layers of composite material 300. The compacting of layers of composite material 300 forms compacted layers of composite material 300.

Figure 6:
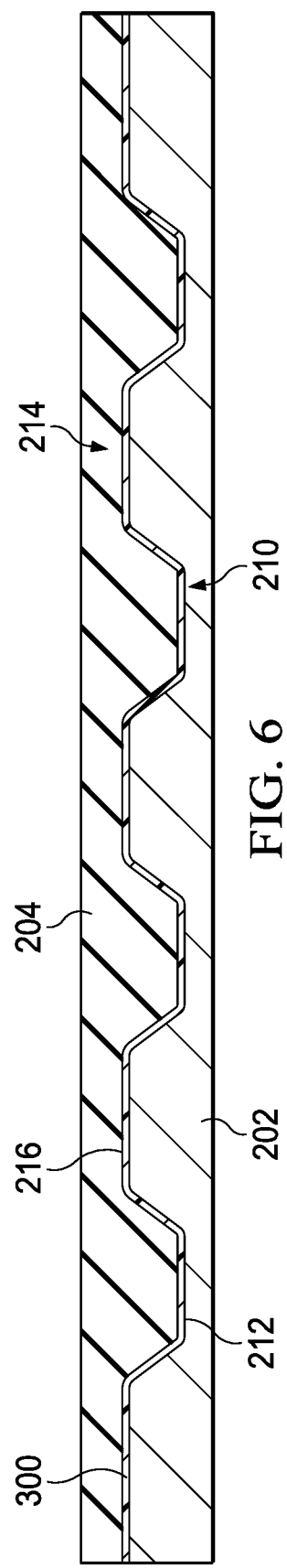
FIG. 6 is an illustration of a cross-sectional view of layers of composite material sandwiched between an inner-mold-line tool and an intensifier in accordance with an illustrative embodiment.

In FIG. 6, an illustration of a cross-sectional view of layers of composite material sandwiched between an inner-mold-line tool and an intensifier is depicted in accordance with an illustrative embodiment. In this figure, a cross-sectional view of layers of composite material 300 between intensifier 204 and inner-mold-line tool 202 is shown taken along lines 6-6 in FIG. 5.

In this view, layers of composite material 300 are shown laid-up on inner-mold-line tool 202 with intensifier 204 placed on inner-mold-line tool 202. As shown in this cross-sectional view, depressions 214 in surface 216 of intensifier 204 correspond to protrusions 210 from surface 212 of inner-mold-line tool 202. In other words, surface 216 of intensifier 204 has a symmetrical shape of surface 212 of inner-mold-line tool 202.

Pressure may be applied to layers of composite material 300 by intensifier 204. In this manner, compacted layers of composite material may be formed by compressing layers of composite material 300 between intensifier 204 and inner-mold-line tool 202.

Figure 7:
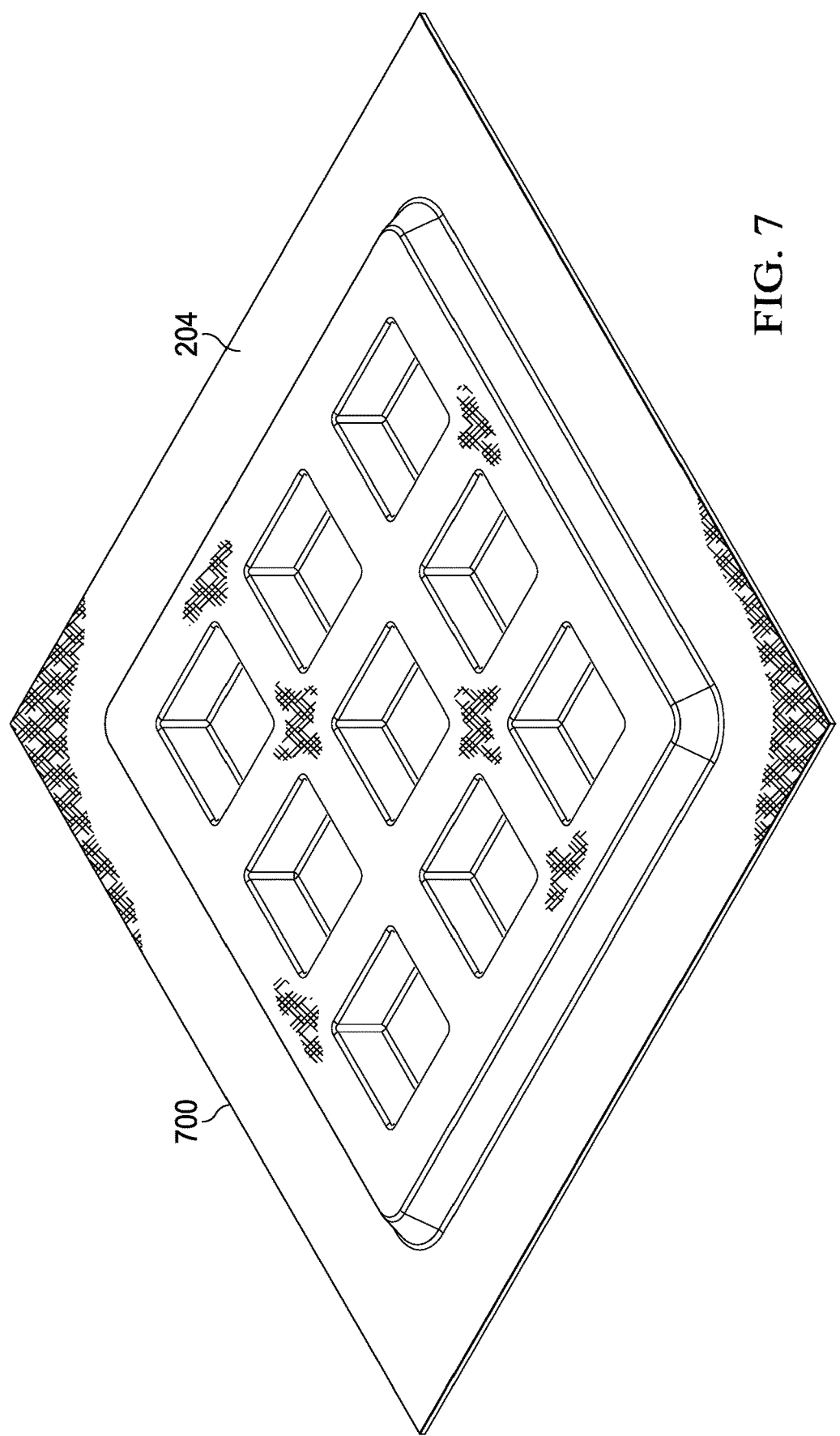
FIG. 7 is an illustration of an inner-mold-line layer in accordance with an illustrative embodiment.

Turning to FIG. 7, an illustration of an inner-mold-line layer is depicted in accordance with an illustrative embodiment. As depicted, inner-mold-line layer 700 is formed by curing layers of composite material as compacted between inner-mold-line tool 202 (not shown) and intensifier 204.

Figure 8:
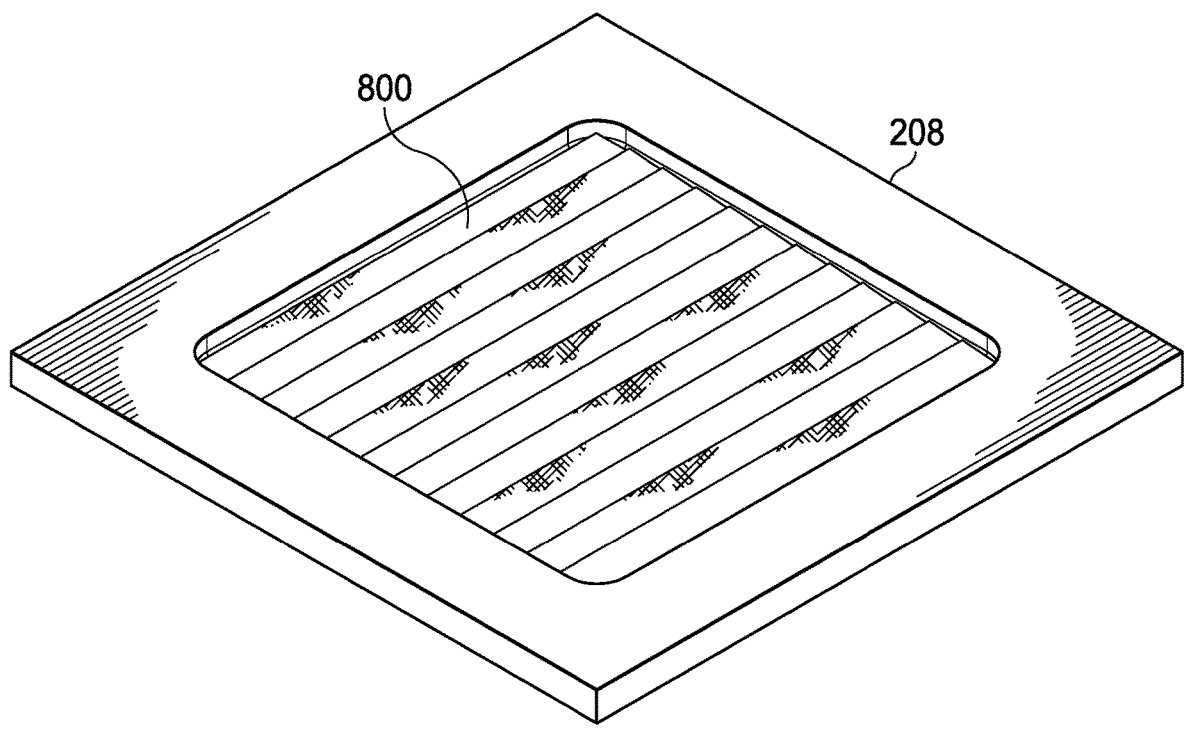
FIG. 8 is an illustration of an outer-mold-line tool with layers of composite material in accordance with an illustrative embodiment.

With reference now to FIG. 8, an illustration of an outer-mold-line tool with layers of composite material is depicted in accordance with an illustrative embodiment. In this figure, layers of composite material 800 are laid-up on outer-mold-line tool 208.

Figure 9:
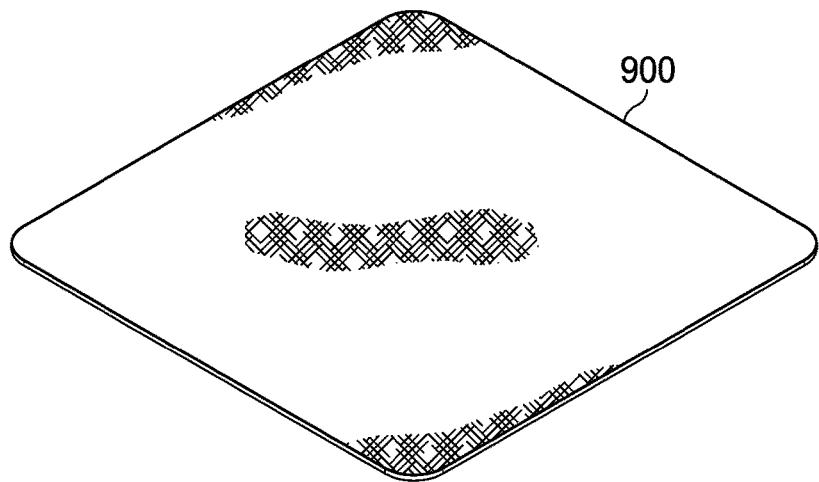
FIG. 9 is an illustration of an outer-mold-line layer in accordance with an illustrative embodiment.

Turning to FIG. 9, an illustration of an outer-mold-line layer is depicted in accordance with an illustrative embodiment. In this example, outer-mold-line layer 900 is formed by curing layers of composite material 800 laid-up on outer-mold-line tool 208.

Figure 10:
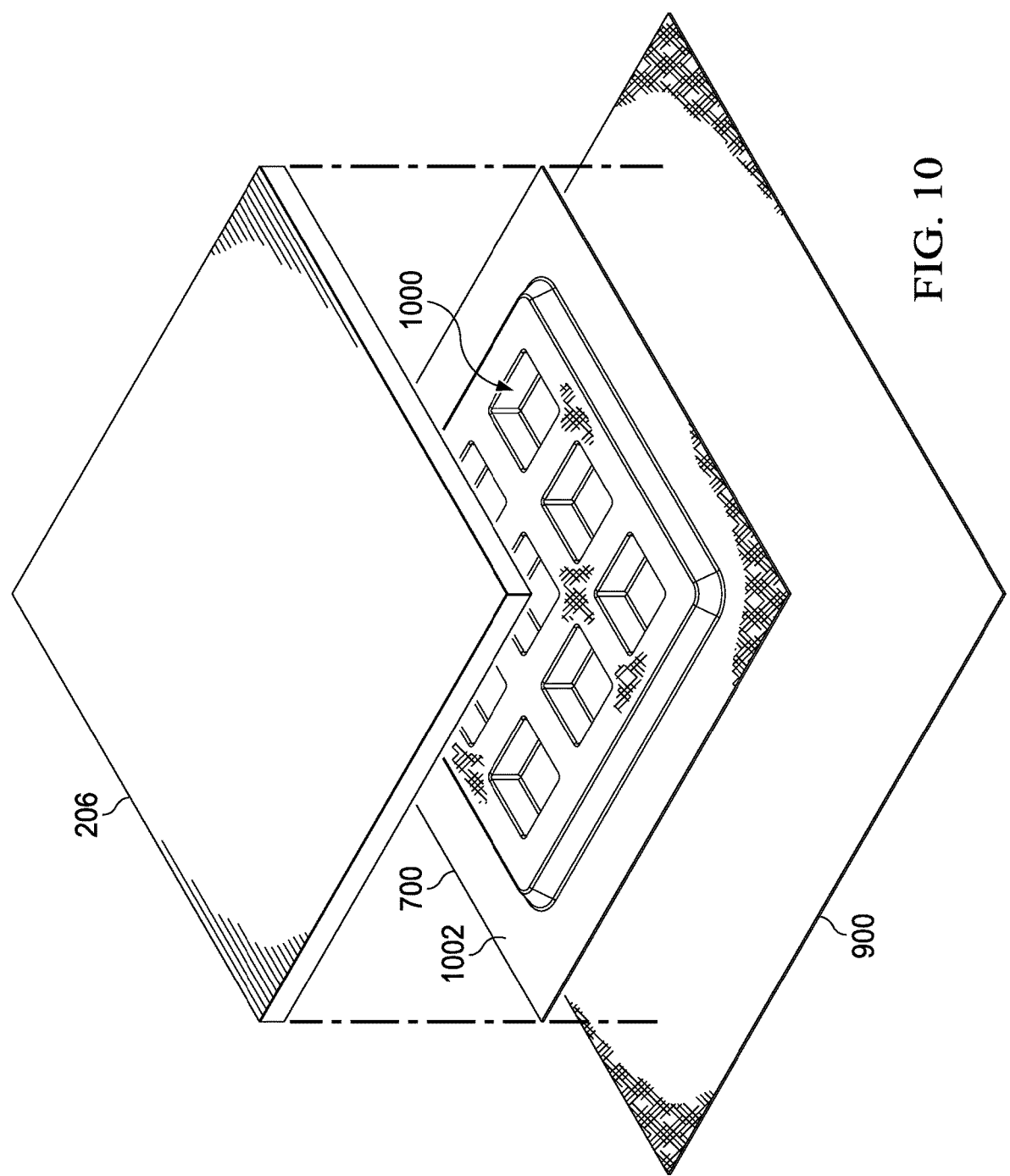
FIG. 10 is an illustration of an inner-mold-line layer positioned relative to an outer-mold-line layer in accordance with an illustrative embodiment.

With reference to FIG. 10, an illustration of an inner-mold-line layer positioned relative to an outer-mold-line layer is depicted in accordance with an illustrative embodiment. In this illustrative example, inner-mold-line layer 700 and outer-mold-line layer 900 are positioned relative to each other for bonding.

Adhesive may be applied to locations where inner-mold-line layer 700 and outer-mold-line layer 900 are in contact with each other when positioned for bonding. These locations include depressions 1000 and edge 1002, which are locations that contact outer-mold-line layer 900.

As depicted, bonding tool 206 is positioned on inner-mold-line layer 700. Bonding tool 206 is utilized to apply pressure to the locations where inner-mold-line layer 700 and outer-mold-line layer 900 contact each other when positioned for bonding. In this depicted example, these locations comprise depressions 1000 and edge 1002 of inner-mold-line layer 700.

Figure 11:
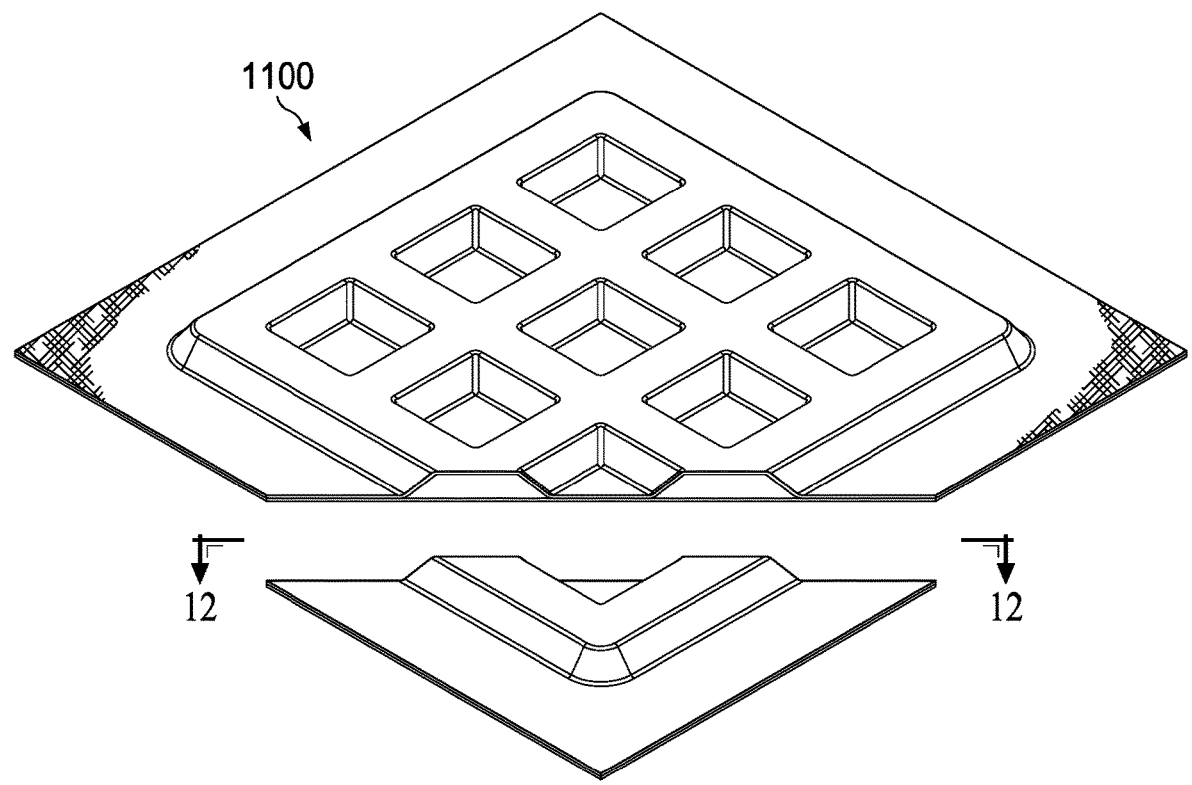
FIG. 11 is an illustration of a stiffened panel in accordance with an illustrative embodiment.

With reference now to FIG. 11, an illustration of a stiffened panel is depicted in accordance with an illustrative embodiment. Stiffened panel 1100 results from bonding inner-mold-line layer 700 and outer-mold-line layer 900 to each other.

Figure 12:
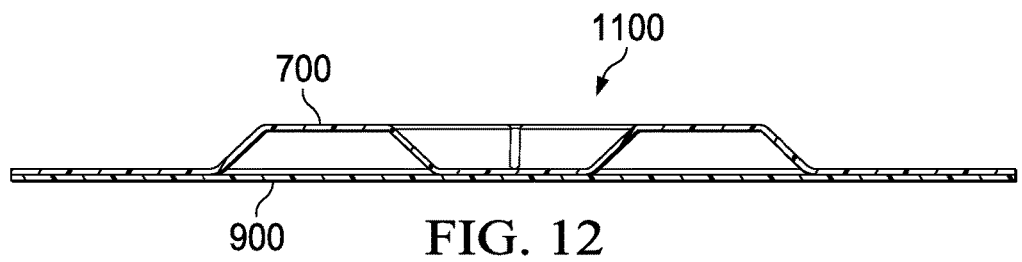
FIG. 12 is an illustration of a cross-sectional view of a stiffened panel in accordance with an illustrative embodiment.

Turning to FIG. 12, an illustration of a cross-sectional view of a stiffened panel is depicted in accordance with an illustrative embodiment. In this depicted example, a cross-sectional view of stiffened panel 1100 taken along lines 12-12 in FIG. 11 is depicted. As depicted, stiffened panel 1100 is an example of a composite structure that may be fabricated using tool system 200 in FIG. 2 and the process illustrated in FIGS. 3-10.

The illustration of tool system 200 and stiffened panel 1100 are not meant to limit the manner in which other illustrative examples may be implemented. For example, in other illustrative examples, a stiffened panel may be curved or have other shapes in addition to or in place of the planer shape shown for stiffened panel 1100. As another illustrative example, bonding tool 206 may be omitted in other illustrative examples.

Figure 13:
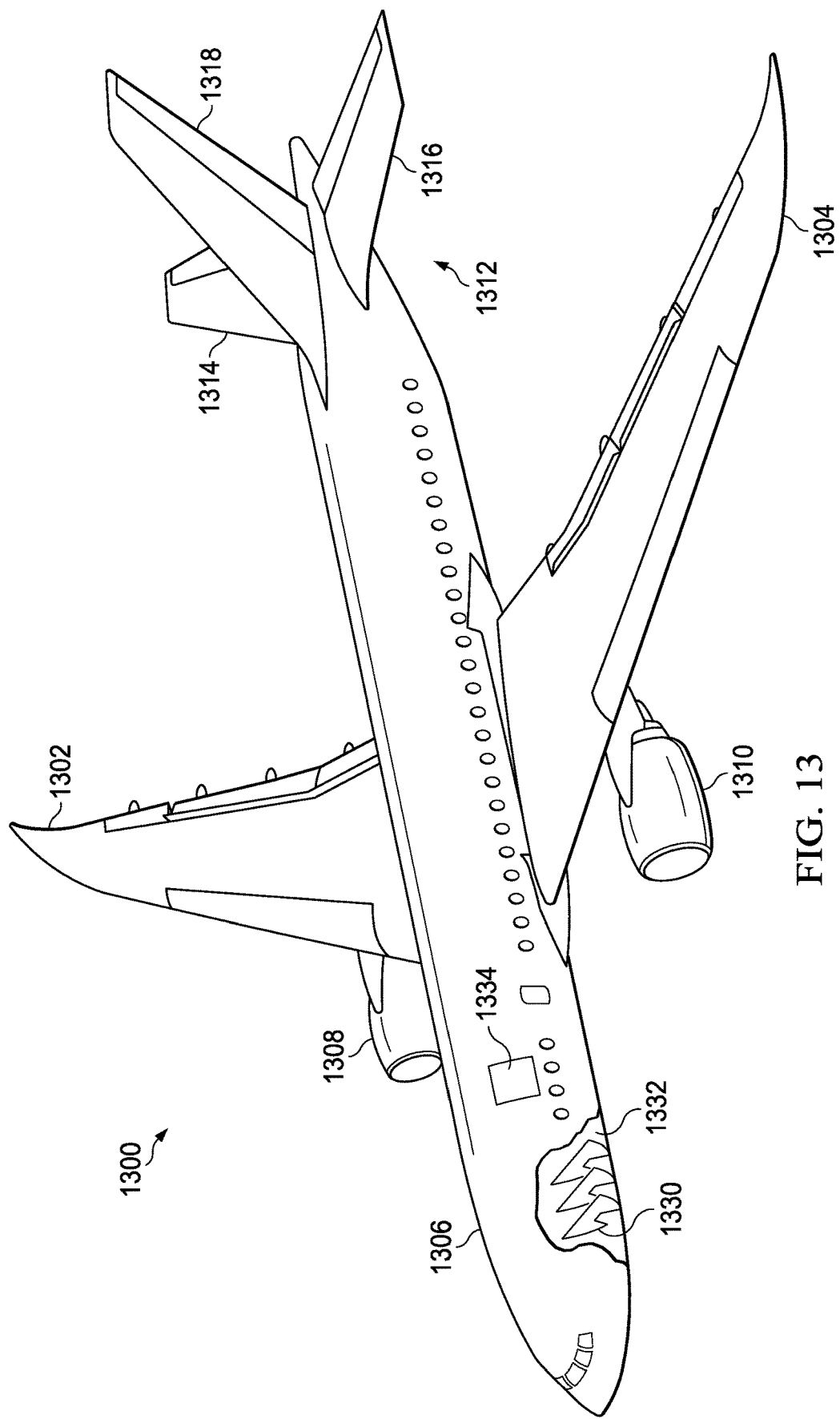
FIG. 13 is an illustration of an aircraft in accordance with an illustrative embodiment.

Turning next to FIG. 13, an illustration of an aircraft is depicted in accordance with an illustrative embodiment. In this illustrative example, aircraft 1300 has wing 1302 and wing 1304 attached to fuselage 1306. Aircraft 1300 includes engine 1308 attached to wing 1302 and engine 1310 attached to wing 1304.

Fuselage 1306 has tail section 1312. Horizontal stabilizer 1314, horizontal stabilizer 1316, and vertical stabilizer 1318 are attached to tail section 1312 of fuselage 1306.

Aircraft 1300 is an example of a platform in which stiffened panels may be used in accordance with an illustrative embodiment. For example, bulkhead 1330 as seen in exposed portion 1332 in fuselage 1306 may be implemented using a stiffened panel. As another example, skin panel 1334 of fuselage 1306 also may be implemented using a stiffened panel.

Figure 14:
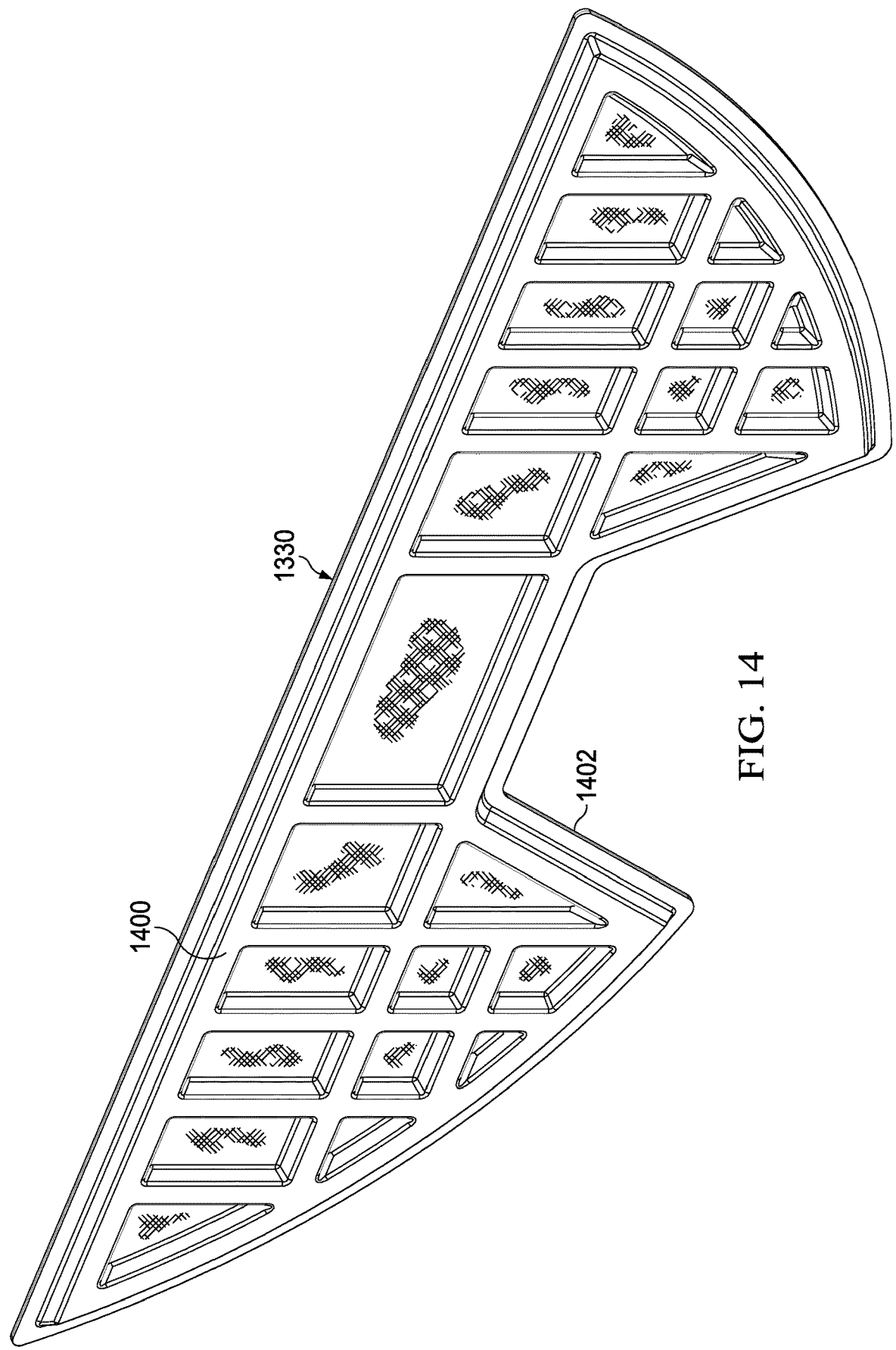
FIG. 14 is an illustration of a stiffened panel for a bulkhead in accordance with an illustrative embodiment.

Turning now to FIG. 14, an illustration of a stiffened panel for a bulkhead is depicted in accordance with an illustrative embodiment. In this illustrative example, an enlarged view of bulkhead 1330 is shown. Bulkhead 1330 is a two-piece bulkhead formed from inner-mold-line layer 1400 and outer-mold-line layer 1402, which are joined to each other. The joining of these two composite components may be made using at least one of bonding, fastening, thermal forming, or some other suitable techniques for joining composite components to each other.

Figure 15:
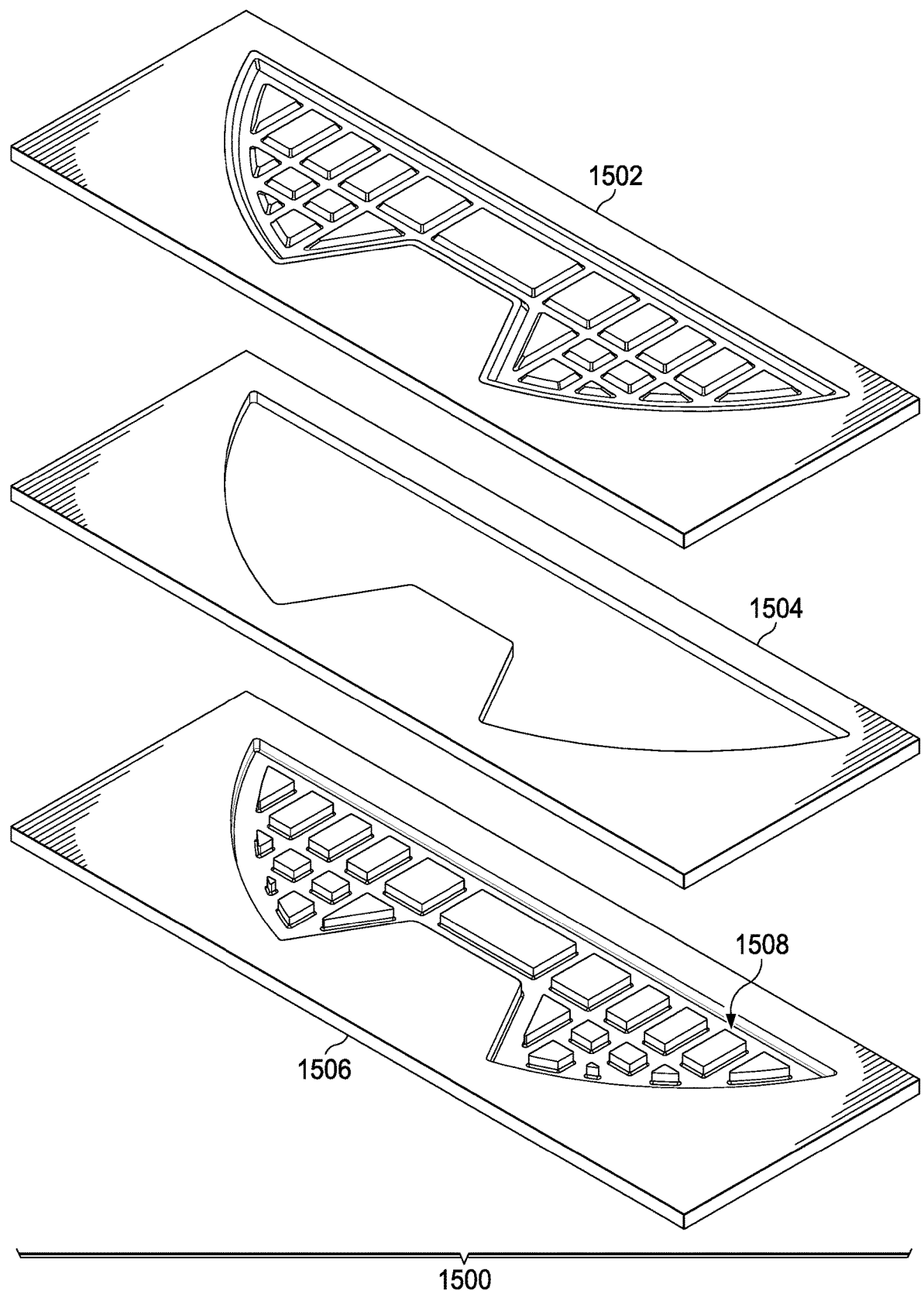
FIG. 15 is an illustration of a tool system for fabricating a stiffened panel for use as a bulkhead in accordance with an illustrative embodiment.

Turning now to FIG. 15, an illustration of a tool system for fabricating a stiffened panel for use as a bulkhead is depicted in accordance with an illustrative embodiment. As depicted, tool system 1500 is used to fabricate a stiffened panel in the form of bulkhead 1330 shown in FIGS. 13 and 14.

As depicted, tool system 1500 includes a number of different tools. In this illustrative example, tool system 1500 comprises inner-mold-line tool 1502, outer-mold-line tool 1504, and bonding jig 1506.

Layers of composite material may be laid-up on inner-mold-line tool 1502. These layers may be prepreg, dry preform, or other types of composite materials. When layers of composite material are laid-up on inner-mold-line tool 1502, these layers may be cured in an oven, a press, an autoclave, or some other suitable type of curing to form an inner-mold-line layer for bulkhead 1330.

Outer-mold-line tool 1504 also may be used to lay-up layers of composite material to form a flat sheet of outer-mold-line layer 1402 for bulkhead 1330.

The bonding tool takes the form of bonding jig 1506 in this illustrative example. As depicted, bonding jig 1506 includes protrusions 1508, which may take the form of raised rubber intensifiers for use in bonding or thermal joining. Inner-mold-line layer 1400 and outer-mold-line layer 1402 in FIG. 14 may be joined to each other in bonding jig 1506.

Figure 16:
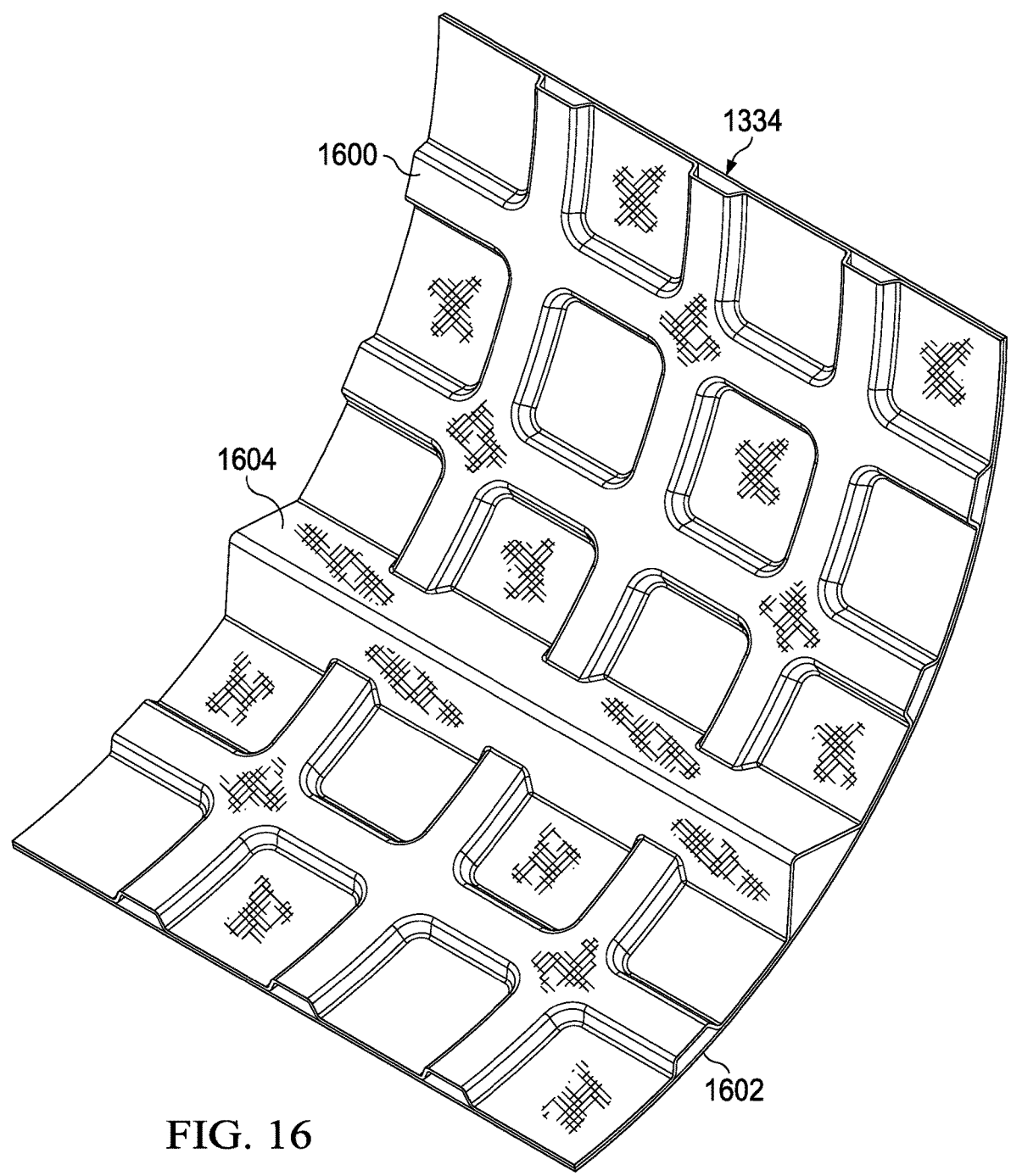
FIG. 16 is an illustration of a stiffened panel for a skin panel in accordance with an illustrative embodiment.

With reference next to FIG. 16, an illustration of a stiffened panel for a skin panel is depicted in accordance with an illustrative embodiment. In this illustrative example, skin panel 1334 comprises inner-mold-line layer 1600 and outer-mold-line layer 1602. These two components form a stiffened panel for skin panel 1334 in the form of a two-piece fuselage skin panel. In this illustrative example, inner-mold-line layer 1600 includes floor-attachment area 1604 for attaching components to the floor of aircraft 1300 in FIG. 13.

Figure 17:
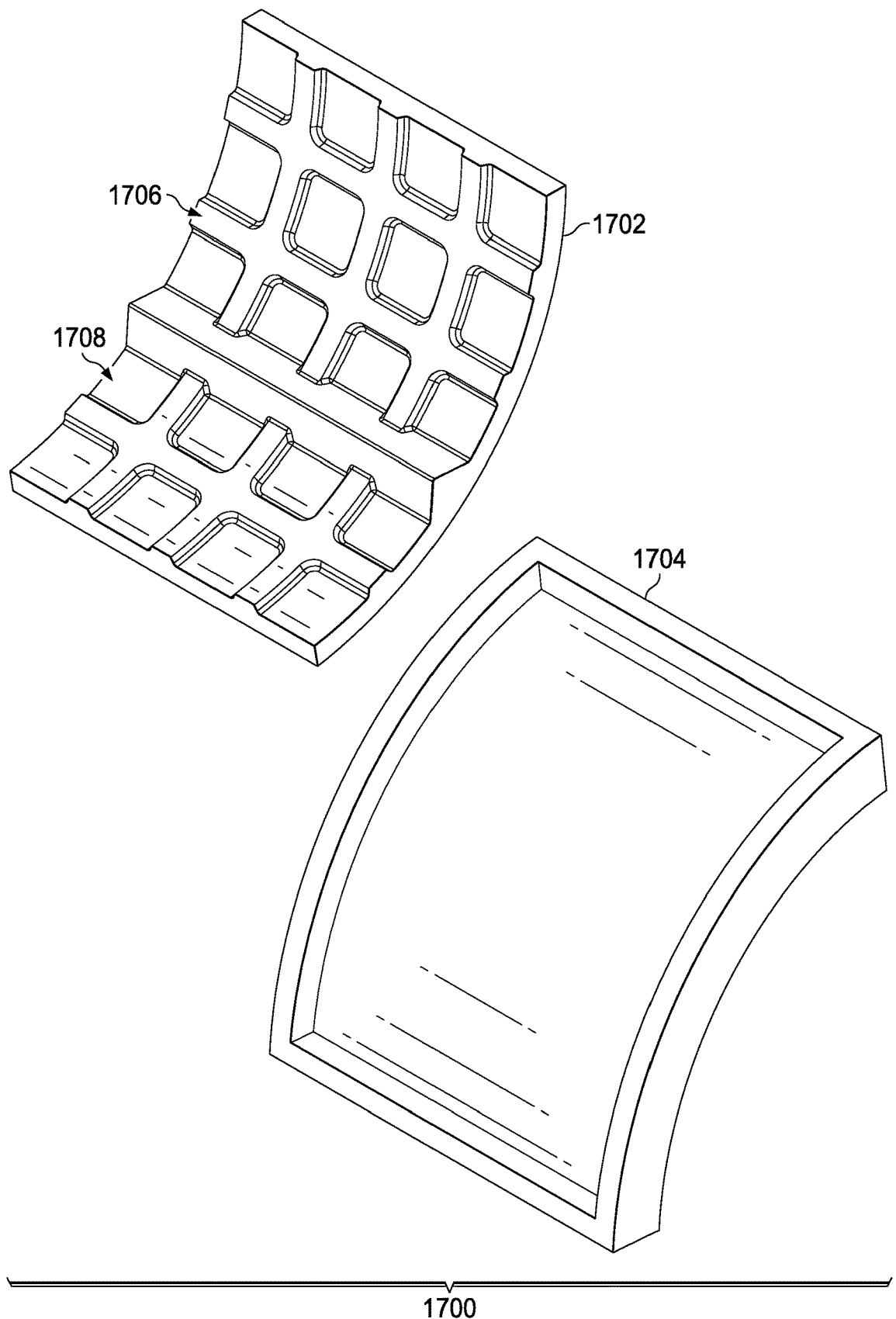
FIG. 17 is an illustration of a tool system for fabricating a stiffened panel for use as a skin panel in accordance with an illustrative embodiment.

With reference now to FIG. 17, an illustration of a tool system for fabricating a stiffened panel for use as a skin panel is depicted in accordance with an illustrative embodiment. In this illustrative example, tool system 1700 includes inner-mold-line tool 1702 and outer-mold-line tool 1704. Inner-mold-line tool 1702 may be used to lay-up composite materials to form an inner-mold-line layer for a stiffened panel.

As depicted, inner-mold-line tool 1702 includes raised features 1706 and depressions 1708. Depressions 1708 correspond to the aerodynamic surfaces in this illustrative example. These aerodynamic surfaces may be for a fuselage, a wing, an empennage, or some other suitable component on which a skin panel may be used.

Composite materials may be laid-up on outer-mold-line tool 1704 to form an outer-mold-line layer. The outer-mold-line layer is the outer skin for the skin panel in this depicted example.

Figure 18:
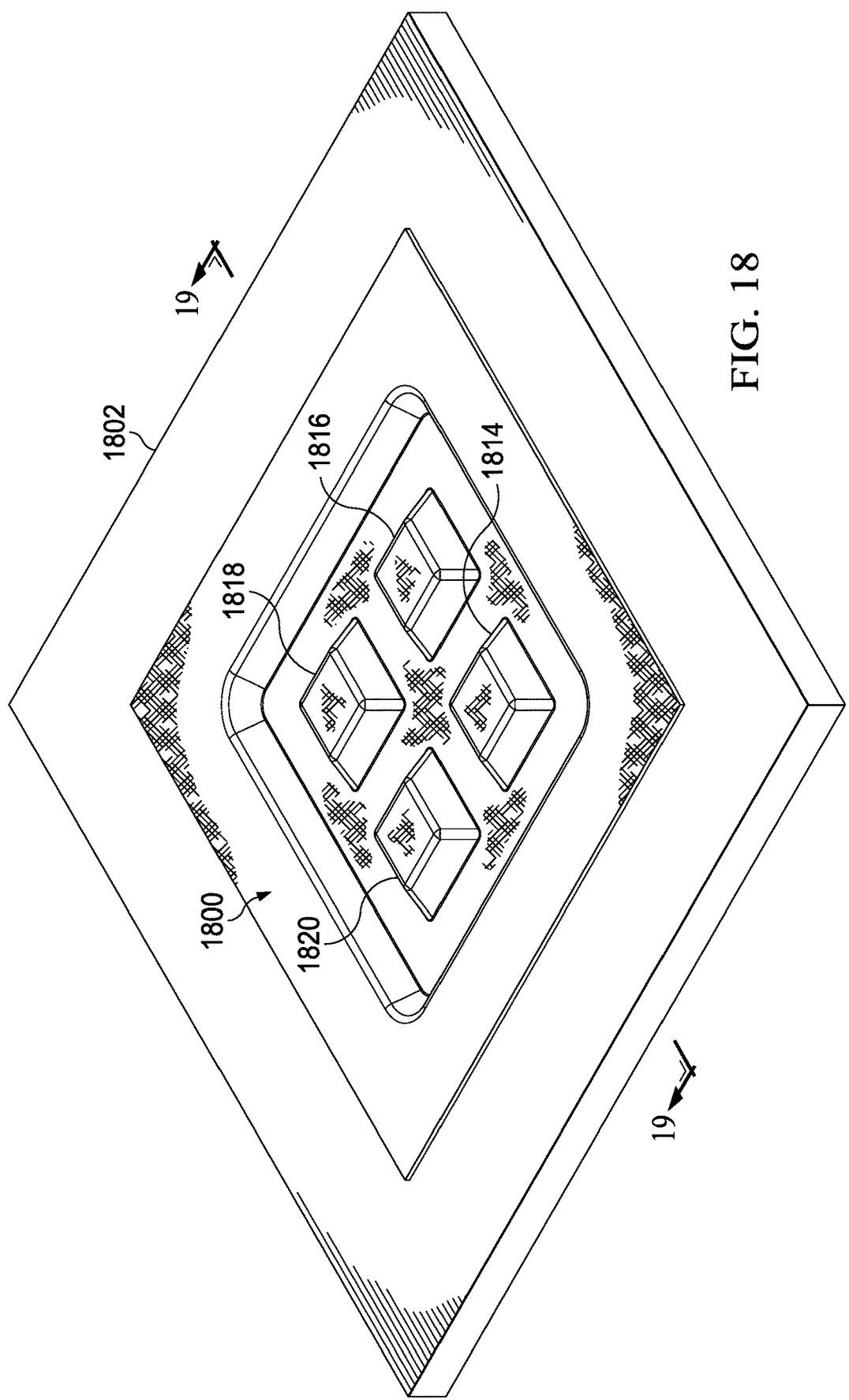
FIG. 18 is an illustration of composite materials for use with an inner-mold-line tool in accordance with an illustrative embodiment.

Turning to FIG. 18, an illustration of composite materials for use with an inner-mold-line tool is depicted in accordance with an illustrative embodiment. In this illustrative example, layers of composite material 1800 may be laid-up on inner-mold-line tool 1802. Layers of composite material 1800 or preforms for layers of composite material 1800 may be selected from at least one of a prepreg, a fabric that is later infused with a resin, a unidirectional fibrous tape, a fibrous tow, a dry fibrous preform, or some other suitable type of composite material or preform. In this example, inner-mold-line tool 1802 has protrusion 1814, protrusion 1816, protrusion 1818, and protrusion 1820.

Figure 19:
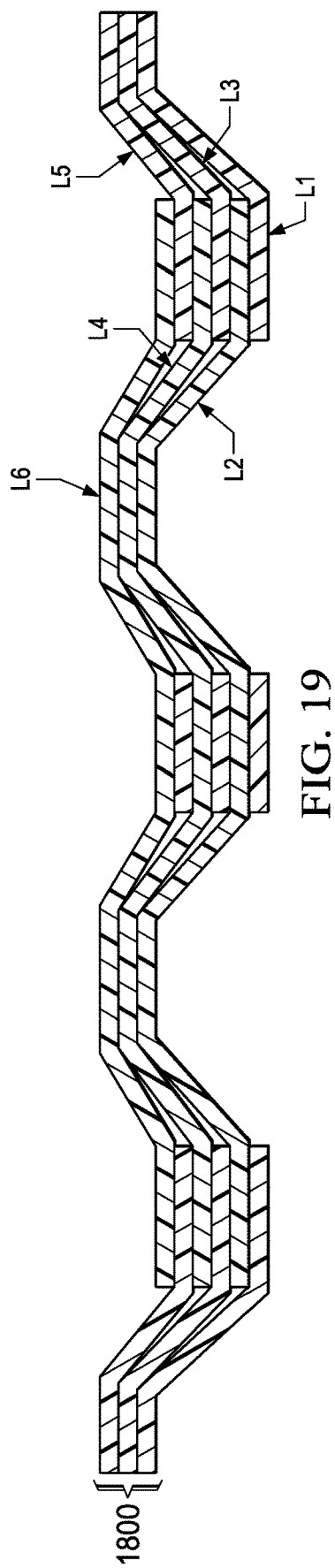
FIG. 19 is an illustration of a cross-sectional view of composite materials laid-up on an inner-mold-line tool in accordance with an illustrative embodiment.

Turning to FIG. 19, an illustration of a cross-sectional view of composite materials laid-up on an inner-mold-line tool is depicted in accordance with an illustrative embodiment. A cross-sectional view of layers of composite material 1800 is shown taken along lines 19-19 in FIG. 18.

Layers of composite material 1800 may be formed by interleaving continuous plies with doubler plies and protrusion plies. The doubler plies include openings for the protrusions in the inner-mold-line tool. The protrusion plies are plies covering the protrusions. In this illustrative example, layers of composite material 1800 includes layer L1, layer L2, layer L3, layer L4, layer L5, and layer L6.

Figure 20:
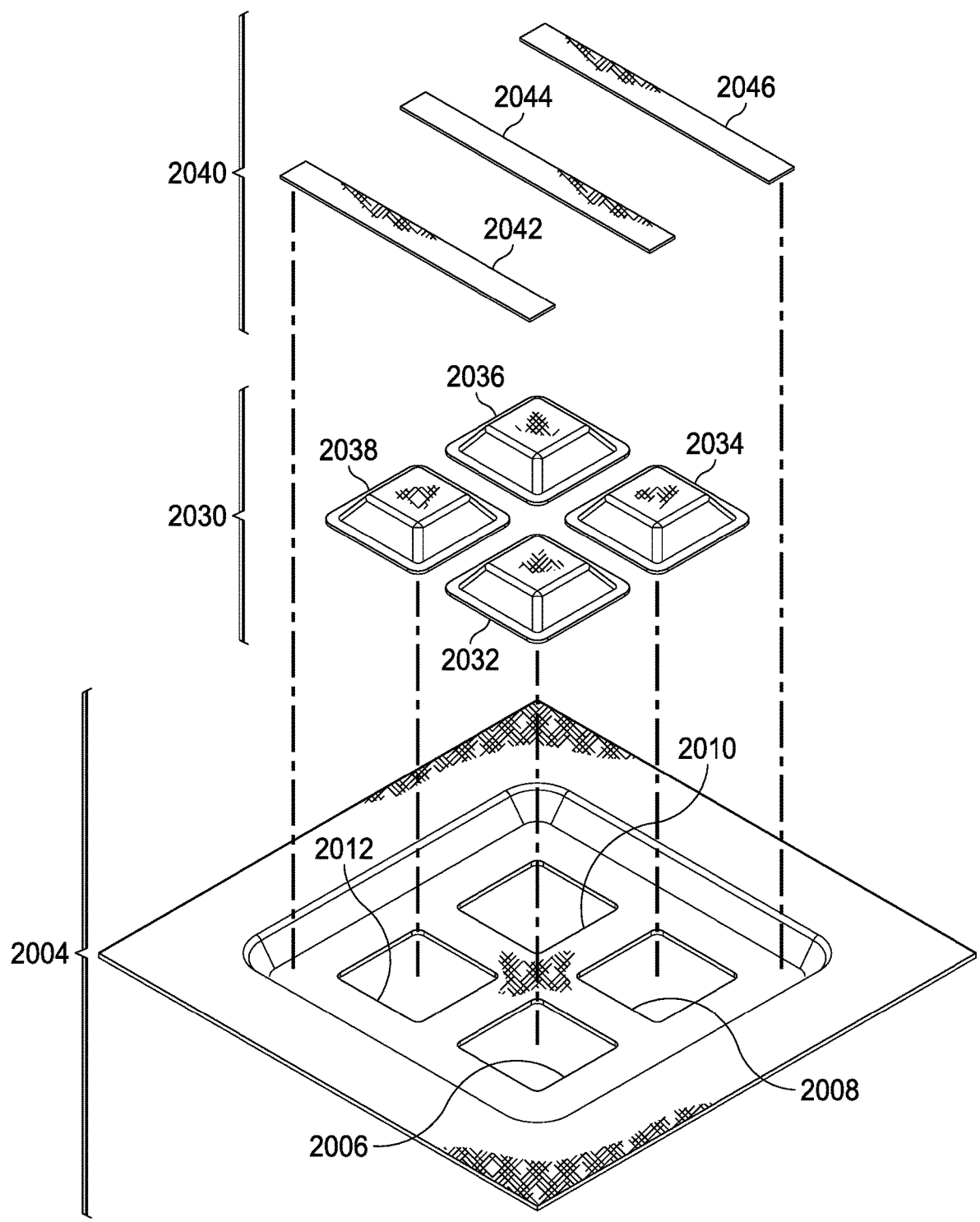
FIG. 20 is an exploded view of layers of composite material on an inner-mold-line tool in accordance with an illustrative embodiment.

With reference next to FIG. 20, an exploded view of layers of composite material on an inner-mold-line tool is depicted in accordance with an illustrative embodiment. As depicted in this figure, layers of composite material may be divided into portions.

In this illustrative example, portion 2004 includes opening 2006, opening 2008, opening 2010, and opening 2012. Portion 2004 is comprised of layer L1, layer L3, and layer L5 previously shown in FIG. 19. These openings correspond to protrusion 1814, protrusion 1816, protrusion 1818, and protrusion 1820, respectively, shown in FIG. 18, on inner-mold-line tool 1802.

As depicted, the layers of composite material also include portion 2030. Portion 2030 includes cap section 2032, cap section 2034, cap section 2036, and cap section 2038. Portion 2030 is comprised of layer L2, layer L4, and layer L6 previously shown in FIG. 19. Cap section 2032, cap section 2034, cap section 2036, and cap section 2038 are placed over protrusion 1814, protrusion 1816, protrusion 1818, protrusion 1820 on inner-mold-line tool 1802 in FIG. 18 and cover opening 2006, opening 2008, opening 2010, and opening 2012.

In this illustrative example, portion 2040 is also present. Portion 2040 includes stiffener 2042, stiffener 2044, and stiffener 2046. These components are included in this example to provide for additional stiffening of the panel.

The illustration of the tools and operations performed to fabricate stiffened panels taking the form of bulkheads and skin panels is not meant to limit the manner in which other illustrative examples may be implemented. For example, other types of stiffened panels may be formed in addition to or in place of bulkheads and skin panels. For example, closet walls, stringers, and other types of structures may be implemented using stiffened panels.

Figure 21:
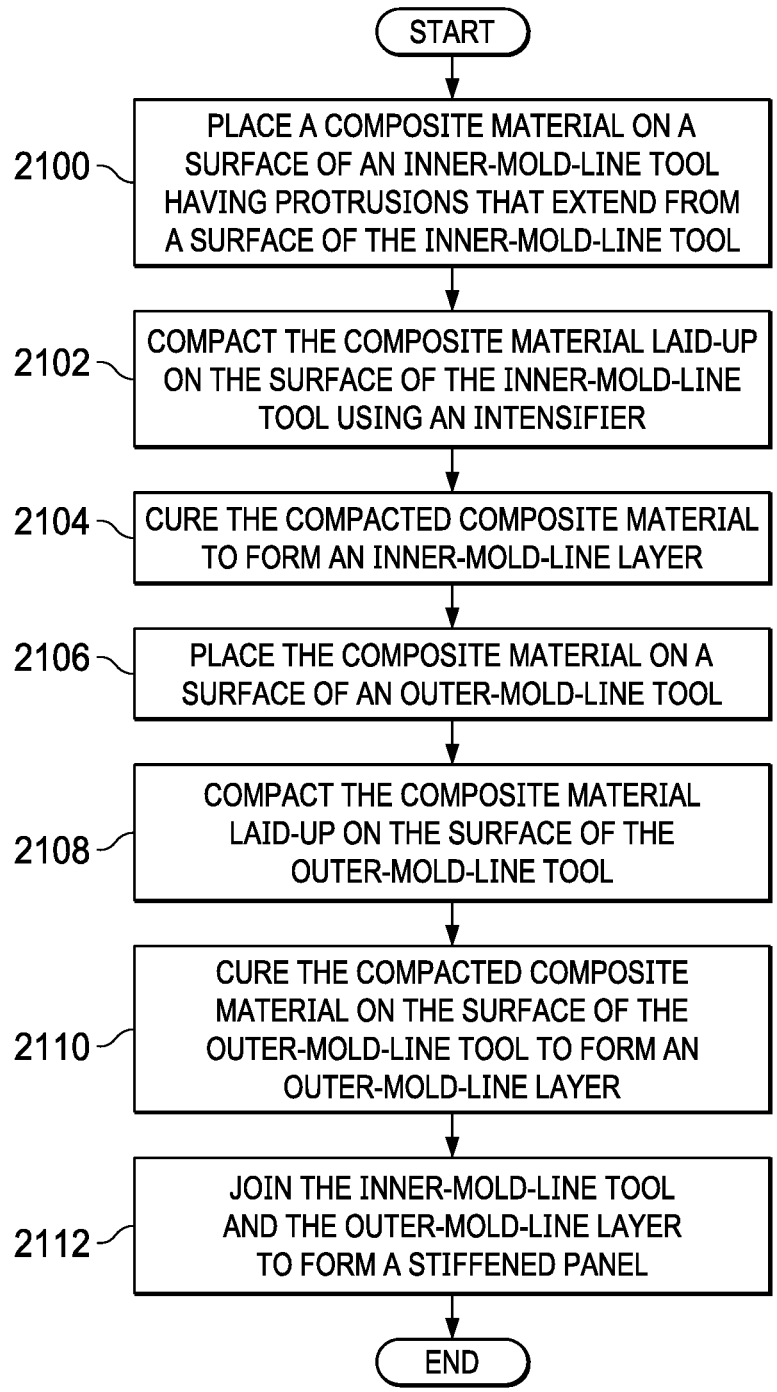
FIG. 21 is an illustration of a flowchart of a process for fabricating a stiffened panel in accordance with an illustrative embodiment.

Turning next to FIG. 21, an illustration of a flowchart of a process for fabricating a stiffened panel is depicted in accordance with an illustrative embodiment. The process illustrated in FIG. 21 may be implemented in composite manufacturing environment 100 to form stiffened panel 104 shown in block form in FIG. 1.

The process begins by placing a composite material on a surface of an inner-mold-line tool having protrusions that extend from a surface of the inner-mold-line tool (operation 2100). The shape and dimensions of the protrusions may be selected to accommodate mating components, parts, or hardware. The process compacts the composite material laid-up on the surface of the inner-mold-line tool using an intensifier (operation 2102). Operation 2102 forms a compacted composite material. Using an intensifier to compact the composite material is optional.

The process cures the compacted composite material to form an inner-mold-line layer (operation 2104). The inner-mold-line layer has a surface with corresponding protrusions that correspond to the protrusions in the surface of the inner mold-line tool.

The process places the composite material on a surface of an outer-mold-line tool (operation 2106). The process also compacts the composite material laid-up on the surface of the outer-mold-line tool (operation 2108). The surface of the outer-mold-line tool is substantially smooth. In other words, the surface of the outer-mold-line tool does not contain protrusions. The compacted composite material on the surface of the outer-mold-line tool is cured to form an outer-mold-line layer (operation 2110).

The process joins the inner-mold-line tool and the outer-mold-line layer to form a stiffened panel (operation 2112), with the process terminating thereafter. The joining may be performed in a number of different ways. For example, the joining may be performed by bonding, fastening, or other suitable techniques. Bonding may be performed using adhesive bonding, melt-bonding, or other suitable techniques. Fastening may be performed using various types of fasteners to connect two components to each other.

The stiffened panel fabricated using this process may have strengths comparable or greater than a sandwich structure of the same weight. Further, the stiffened panel is fabricated without using mandrels or other tools within hollow sections of the structure. As a result, access to these sections is unnecessary to manufacture the stiffened panel.

Figure 22:
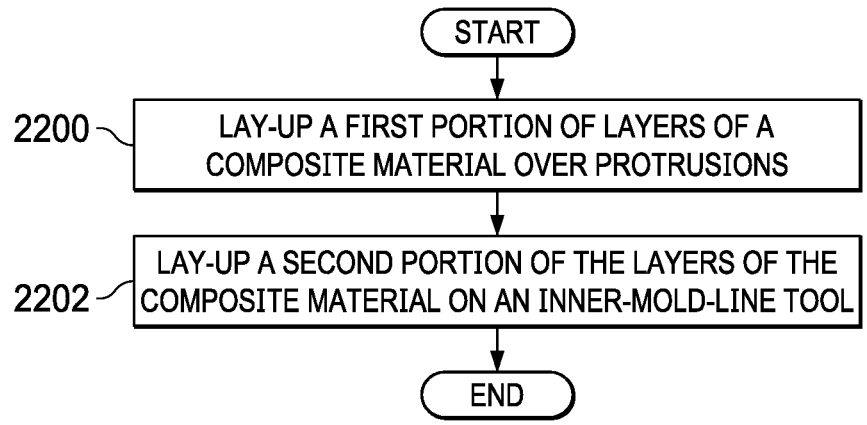
FIG. 22 is an illustration of a flowchart of a process for laying-up layers of composite material in accordance with an illustrative embodiment.

With reference next to FIG. 22, an illustration of a flowchart of a process for laying-up layers of composite material is depicted in accordance with an illustrative embodiment. The process illustrated in FIG. 22 may be implemented in composite manufacturing environment 100 to lay-up layers of composite material 108 on a tool, such as inner-mold-line tool 112, shown in block form in FIG. 1.

The process begins by laying-up a first portion of layers of a composite material over protrusions (operation 2200). The process lays-up a second portion of the layers of the composite material on an inner-mold-line tool (operation 2202). The process terminates thereafter. The second portion of the layers of composite material has openings corresponding to the protrusions. Further, each of the portions may have multiple layers of composite material. In other words, the second portion may be comprised of one or more layers of composite material. The different layers may have different orientations and may be formed from different types of composite material.

Figure 23:
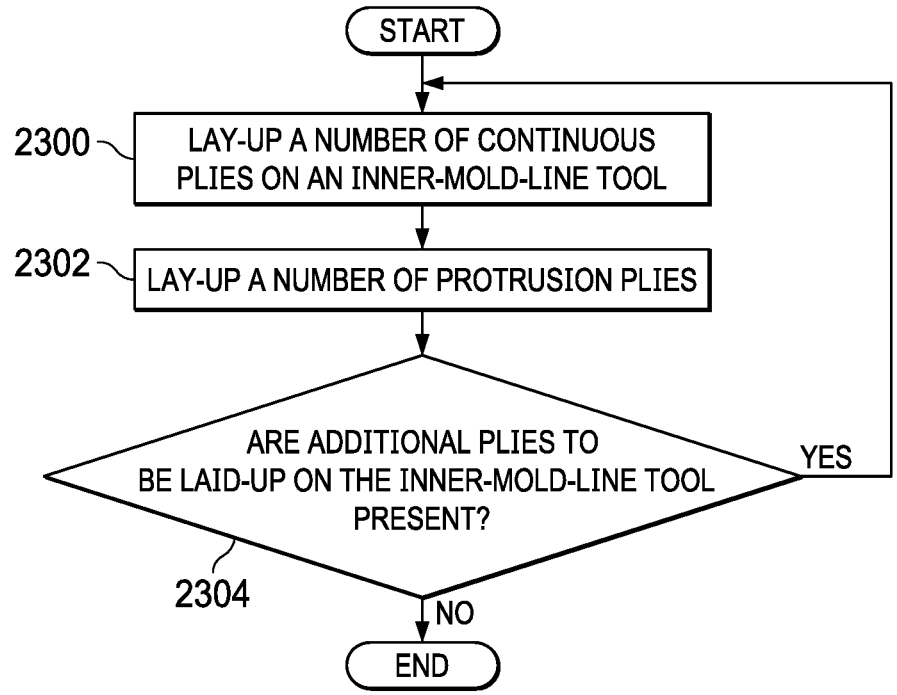
FIG. 23 is an illustration of a flowchart of a process for laying-up layers of composite material in accordance with an illustrative embodiment.

With reference next to FIG. 23, an illustration of a flowchart of a process for laying-up layers of composite material is depicted in accordance with an illustrative embodiment. The process illustrated in FIG. 23 may be implemented in composite manufacturing environment 100 to lay-up layers of composite material 108 on a tool, such as inner-mold-line tool 112, shown in block form in FIG. 1.

The process begins by laying-up a number of continuous plies on an inner-mold-line tool (operation 2300). As used herein, "a number of," when used with reference to items, means one or more items. For example, "a number of continuous plies" is one or more continuous plies. In this illustrative example, continuous plies may include openings for features such as protrusions extending from an inner-mold-line tool.

The process lays-up a number of protrusion plies (operation 2302). These protrusion plies are configured to cover protrusions and may overlap the number of continuous plies.

A determination is made as to whether additional plies are present to be laid-up on the inner-mold-line tool (operation 2304). If additional plies are present, the process returns to operation 2300. Otherwise, the process terminates. In this manner, the number of continuous plies may be interleaved with the number of protrusion plies to form the layers of composite material.

Figure 24:
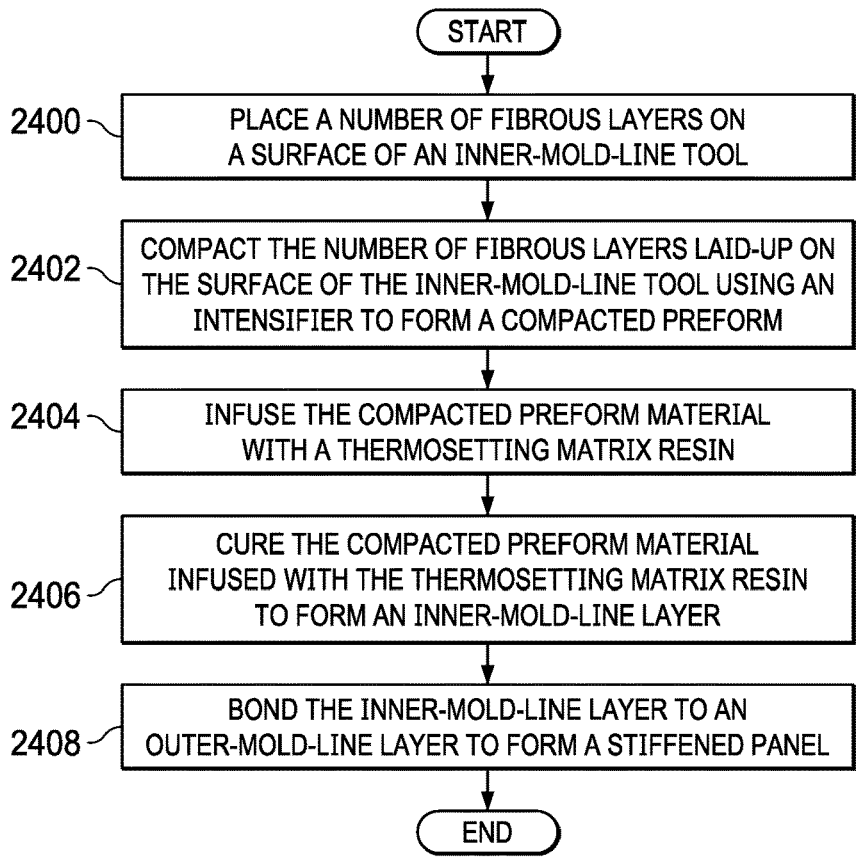
FIG. 24 is an illustration of a flowchart of a process for fabricating a stiffened panel in accordance with illustrative embodiment.

With reference now to FIG. 24, an illustration of a flowchart of a process for fabricating a stiffened panel is depicted in accordance with an illustrative embodiment. The process illustrated in FIG. 24 may be implemented in composite manufacturing environment 100 to lay-up layers of composite material 108 on a tool, such as inner-mold-line tool 112, shown in block form in FIG. 1.

The process begins by placing a number of fibrous layers on a surface of an inner-mold-line tool (operation 2400). In operation 2400, the inner-mold-line tool has protrusions that extend from a surface of the inner-mold-line tool.

In this illustrative example, the fibrous layers laid-up on the inner-mold-line tool form a preform. The fibrous layers comprise structural fibers in this particular example. As depicted, structural fibers are comprised of materials selected from at least one of carbon, glass, ceramic, aramid, or some other suitable type of material. In other words, the structural fibers may be comprised of the same type of material, or different structural fibers may be comprised of different types of materials from other structural fibers in the number of fibrous layers.

In the illustrative example, the structural fibers comprise at least one of a mixture of a plurality of types of structural fibers, discontinuous fibers, stretch-broken discontinuous fibers, chopped discontinuous fibers, a mixture of discontinuous fibers and continuous fibers, or some other suitable types of fibers. Further, the discontinuous and continuous fibers may be located in at least one of different layers or in different regions in the compacted preform material.

The fibrous layers may also include a binder or binding agent in addition to the structural fibers. A binder or binding agent is a material that holds or draws other materials together to form a cohesive whole mechanically, chemically, by adhesion, or by cohesion.

In yet another illustrative example, the fibrous layers may comprise a mixture of structural and thermoplastic fibers with or without a binder or binding agent wherein the thermoplastic, when melted and consolidated, forms the matrix to form the stiffened panel in the form of a thermoplastic panel.

The fibrous layers are substituted for a mixture of structural and thermoplastic fibers with or without a binder or binding agent wherein the thermoplastic, when melted and consolidated, forms the matrix, obviating the need for the infusion of a thermoset matrix resin to form a thermoplastic panel. In the illustrative examples, the structural fibers are stretch-broken and the thermoplastic fibers are chopped, wherein the combination of structural fibers and thermoplastic fibers form an intimate blend. An intimate blend is a combination of two or more staple fibers in a spun yarn that has been blended so that the individual fibers do not retain their individual characteristics.

Further, the structural fibers and the thermoplastic fibers may be commingled. As depicted, the fibrous material is selected from at least one of a unidirectional tape, a woven fabric, a braided fabric, or a non-woven fabric.

The process compacts the number of fibrous layers laid-up on the surface of the inner-mold-line tool using an intensifier to form a compacted preform (operation 2402). In operation 2402, the intensifier has a symmetrical shape of the inner-mold-line tool on which the fibrous preform material is laid-up. The process infuses the compacted preform material with a thermosetting matrix resin (operation 2404).

The process cures the compacted preform material infused with the thermosetting matrix resin to form an inner-mold-line layer (operation 2406). The inner-mold-line layer has corresponding protrusions that correspond to the protrusions on the inner-mold-line tool.

The process bonds the inner-mold-line layer to an outer-mold-line layer to form a stiffened panel (operation 2408). The process terminates thereafter.

In operation 2408, the bonding may be performed using a bonding tool that applies a pressure at bond locations between the inner-mold-line layer and the outer-mold-line layer. The bonding, in this example, may be performed in a number of different ways. For example, bonding may be performed using melt-bonding, adhesive bonding, or some other suitable type of bonding technique.

In operation 2408, the outer-mold-line layer is substantially smooth. As depicted, a layer is smooth when the layer has an even and regular surface or consistency. The surface is free from perceptible projections, lumps, or indentations in this example.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in FIG. 21, operation 2100 and operation 2102 may be performed after operation 2106 and operation 2108, or at substantially the same time. The curing operations in operation 2104 and operation 2110 may be performed at the same time. For example, the composite material laid-up on the inner-mold-line tool and the composite material laid-up on the outer-mold-line tool may be cured in the same autoclave in some illustrative examples.

As another example, in FIG. 22, operation 2202 may be performed prior to operation 2200. Further, operations may be included to lay-up additional portions of layers of composite material for the stiffened panel. In another illustrative example, another operation may be included in the process in FIG. 23 to lay-up a number of doubler plies in addition to the number of protrusion plies in operation 2302. These two operations may be performed such that continuous plies interleave with doubler plies and protrusion plies.

Figure 25:
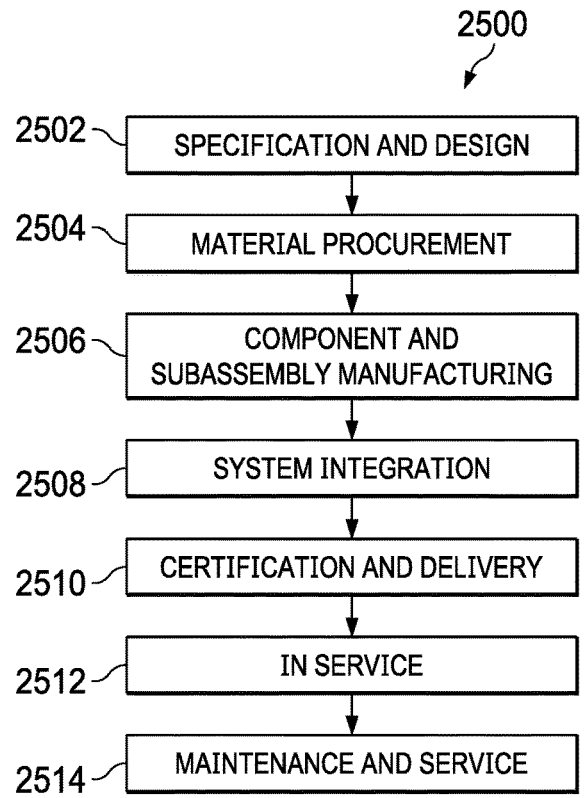
FIG. 25 is an illustration of a block diagram of an aircraft manufacturing and service method in accordance with an illustrative embodiment.
Figure 26:
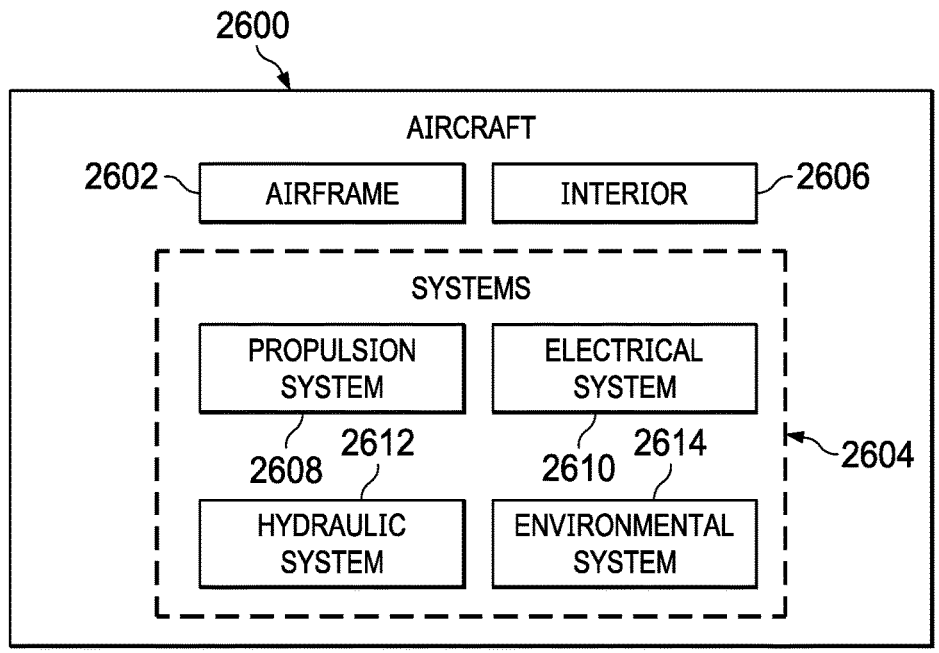
FIG. 26 is an illustration of a block diagram of an aircraft in accordance with an illustrative embodiment.

The illustrative embodiments of the disclosure may be described in the context of aircraft manufacturing and service method 2500 as shown in FIG. 25 and aircraft 2600 as shown in FIG. 26. Turning first to FIG. 25, an illustration of a block diagram of an aircraft manufacturing and service method is depicted in accordance with an illustrative embodiment. During pre-production, aircraft manufacturing and service method 2500 may include specification and design 2502 of aircraft 2600 in FIG. 26 and material procurement 2504.

During production, component and subassembly manufacturing 2506 and system integration 2508 of aircraft 2600 in FIG. 26 takes place. Thereafter, aircraft 2600 in FIG. 26 may go through certification and delivery 2510 in order to be placed in service 2512. While in service 2512 by a customer, aircraft 2600 in FIG. 26 is scheduled for routine maintenance and service 2514, which may include modification, reconfiguration, refurbishment, and other maintenance or service.

Each of the processes of aircraft manufacturing and service method 2500 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 26, an illustration of a block diagram of an aircraft is depicted in accordance with an illustrative embodiment. In this example, aircraft 2600 is produced by aircraft manufacturing and service method 2500 in FIG. 25 and may include airframe 2602 with plurality of systems 2604 and interior 2606. Examples of systems 2604 include one or more of propulsion system 2608, electrical system 2610, hydraulic system 2612, and environmental system 2614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2500 in FIG. 25.

In one illustrative example, components or subassemblies produced in component and subassembly manufacturing 2506 in FIG. 25 may be fabricated or manufactured in a manner similar to components or subassemblies produced while aircraft 2600 is in service 2512 in FIG. 25. As yet another example, one or more apparatus embodiments, method embodiments, or a combination thereof may be utilized during production stages, such as component and subassembly manufacturing 2506 and system integration 2508 in FIG. 25. One or more apparatus embodiments, method embodiments, or a combination thereof may be utilized while aircraft 2600 is in service 2512, during maintenance and service 2514 in FIG. 25, or both. The use of a number of the different illustrative embodiments may substantially expedite the assembly of aircraft 2600, reduce the cost of aircraft 2600, or both expedite the assembly of aircraft 2600 and reduce the cost of aircraft 2600.

Figure 27:
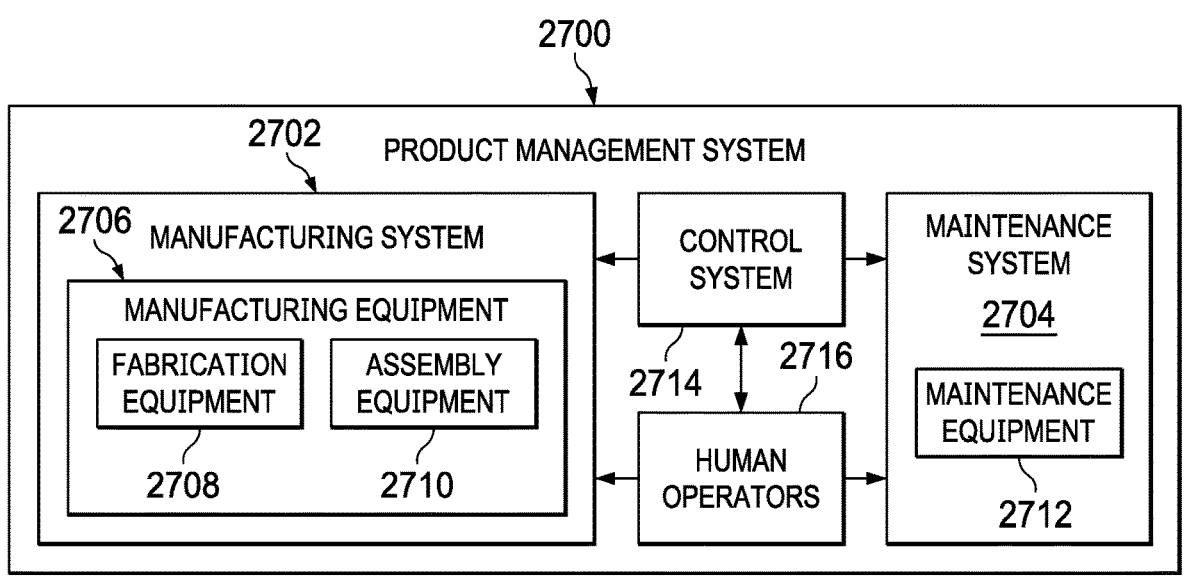
FIG. 27 is an illustration of a block diagram of a product management system in accordance with an illustrative embodiment.

Turning now to FIG. 27, an illustration of a block diagram of a product management system is depicted in accordance with an illustrative embodiment. Product management system 2700 is a physical hardware system. In this illustrative example, product management system 2700 may include at least one of manufacturing system 2702 or maintenance system 2704.

Manufacturing system 2702 is configured to manufacture products, such as aircraft 2600 in FIG. 26. As depicted, manufacturing system 2702 includes manufacturing equipment 2706. Manufacturing equipment 2706 includes at least one of fabrication equipment 2708 or assembly equipment 2710.

Fabrication equipment 2708 is equipment that may be used to fabricate components for parts used to form aircraft 2600 in FIG. 26. For example, fabrication equipment 2708 may include machines and tools. These machines and tools may be at least one of a drill, a hydraulic press, a furnace, a mold, a composite tape laying machine, a vacuum system, a lathe, or other suitable types of equipment. Fabrication equipment 2708 may be used to fabricate at least one of metal parts, composite parts, fasteners, ribs, skin panels, spars, antennas, or other suitable types of parts.

Assembly equipment 2710 is equipment used to assemble parts to form aircraft 2600 in FIG. 26. In particular, assembly equipment 2710 may be used to assemble components and parts to form aircraft 2600 in FIG. 26. Assembly equipment 2710 also may include machines and tools. These machines and tools may be at least one of a robotic arm, a crawler, a faster-installation system, a rail-based drilling system, or a robot. Assembly equipment 2710 may be used to assemble parts such as seats, horizontal stabilizers, wings, engines, engine housings, landing-gear systems, and other parts for aircraft 2600 in FIG. 26.

In this illustrative example, maintenance system 2704 includes maintenance equipment 2712. Maintenance equipment 2712 may include any equipment needed to perform maintenance on aircraft 2600 in FIG. 26. Maintenance equipment 2712 may include tools for performing different operations on parts on aircraft 2600. These operations may include at least one of disassembling parts, refurbishing parts, inspecting parts, reworking parts, manufacturing replacement parts, or other operations for performing maintenance on aircraft 2600 in FIG. 26. These operations may be for routine maintenance, inspections, upgrades, refurbishment, or other types of maintenance operations.

In the illustrative example, maintenance equipment 2712 may include ultrasonic inspection devices, x-ray imaging systems, vision systems, drills, crawlers, and other suitable device. In some cases, maintenance equipment 2712 may include fabrication equipment 2708, assembly equipment 2710, or both, to produce and assemble parts that may be needed for maintenance.

Product management system 2700 also includes control system 2714. Control system 2714 is a hardware system and may also include software or other types of components. Control system 2714 is configured to control the operation of at least one of manufacturing system 2702 or maintenance system 2704. In particular, control system 2714 may control the operation of at least one of fabrication equipment 2708, assembly equipment 2710, or maintenance equipment 2712.

The hardware in control system 2714 may be using hardware that may include computers, circuits, networks, and other types of equipment. The control may take the form of direct control of manufacturing equipment 2706. For example, robots, computer-controlled machines, and other equipment may be controlled by control system 2714. In other illustrative examples, control system 2714 may manage operations performed by human operators 2716 in manufacturing or performing maintenance on aircraft 2600 in FIG. 26. For example, control system 2714 may assign tasks, provide instructions, display models, or perform other operations to manage operations performed by human operators 2716. In these illustrative examples, the processes illustrated in the different flowcharts in FIGS. 21-24 may be implemented in control system 2714 to manage at least one of the manufacturing or maintenance of aircraft 2600 in FIG. 26. For example, the different operations may be implement in program code to control the operation of at least one of manufacturing equipment 2706 or maintenance equipment 2712. Additionally, the different operations may be implemented in control system 2714 to assign instructions to human operators 2716.

In the different illustrative examples, human operators 2716 may operate or interact with at least one of manufacturing equipment 2706, maintenance equipment 2712, or control system 2714. This interaction may be performed to manufacture aircraft 2600 in FIG. 26.

Of course, product management system 2700 may be configured to manage other products other than aircraft 2600 in FIG. 26. Although product management system 2700 has been described with respect to manufacturing in the aerospace industry, product management system 2700 may be configured to manage products for other industries. For example, product management system 2700 may be configured to manufacture products for the automotive industry as well as any other suitable industries.

Thus, the illustrative embodiments provide a method, apparatus, and system for fabricating a stiffened panel. The stiffened panel is comprised of composite materials. Layers of composite material are placed on a surface of an inner-mold-line tool having protrusions that extend from the surface of the inner-mold-line tool. The layers of composite material laid-up on the surface of the inner-mold-line tool are compacted using an intensifier to form compacted layers of composite material. The compacted layers of composite material are cured to form an inner-mold-line layer having corresponding protrusions. The inner-mold-line layer is bonded to an outer-mold-line layer to form the stiffened panel.

In one illustrative example, one or more technical solutions are present that overcome a technical problem with forming stiffened panels using sandwich structures. As a result, one or more technical solutions may provide a technical effect providing a method and apparatus for manufacturing stiffened panels without using mandrels or other tools that may require access to the sections of the stiffened panel to enable removal of these tools.

Further, one or more illustrative examples provide a technical solution to issues with sandwich structures in which honeycomb cores or foam cores are used. One or more technical solutions provide a stiffened panel that provides the same or improved performance as compared to core-stiffened panels of the same weight.

One or more technical solutions provide a technical effect in which stiffened panels may have highly complex geometries on an inner-mold-line layer with a smooth outer-mold-line layer. Additionally, one or more technical solutions have a technical effect of allowing for at least one of a prepreg or conventional fabrics to be draped over complex shapes without undesired wrinkling or fiber distortion. Further, the locations at which the inner-mold-line layer and an outer-mold-line layer meet have areas that are significantly larger than stiffened panels using honeycomb cores sandwiched between two facesheets. As a result, localized bonding occurring with honeycomb panels may be reduced or avoided.

Further, the illustrative examples may provide a technical effect in which reduced maintenance may occur by voiding the use of honeycomb sandwich panels. For example, issues with moisture intrusion and skin-panel inconsistencies may be reduced.

In one illustrative example, a method for fabricating a stiffened panel is present in which, the method comprises placing a number of fibrous layers on a surface of an inner-mold-line tool having protrusions that extend from the surface of the inner-mold-line tool; compacting the number of fibrous layers laid-up on the surface of the inner-mold-line tool using an intensifier to form a compacted preform material; infusing the compacted preform material with a thermosetting matrix resin; curing the compacted preform material infused with the thermosetting matrix resin to form an inner-mold-line layer (122) having corresponding protrusions; and bonding the inner-mold-line layer to an outer-mold-line layer.

In the illustrative example, the number of fibrous layers comprise structural fibers; the structural fibers comprise at least one of a mixture of a plurality of types of structural fibers, discontinuous fibers, stretch-broken discontinuous fibers, chopped discontinuous fibers, or a mixture of the discontinuous fibers and continuous fibers. The discontinuous fibers and the continuous fibers are located in at least one of different layers or different regions in the compacted preform material. The number of fibrous layers comprises structural fibers and a binder. In the illustrative example, the intensifier has a symmetrical shape of the inner-mold-line tool on which the number of fibrous layers are laid-up;

In the illustrative example, bonding the inner-mold-line layer to the outer-mold-line layer comprises bonding the inner-mold-line layer to the outer-mold-line layer (132) using a bonding tool that applies a pressure at bond locations between the inner-mold-line layer and the outer-mold-line layer. In the illustrative example, bonding the inner-mold-line layer to the outer-mold-line layer comprises melt-bonding the inner-mold-line layer (122) to the outer-mold-line layer; bonding the inner-mold-line layer to the outer-mold-line layer comprises bonding the inner-mold-line layer to the outer-mold-line layer (132) using an adhesive.

In the illustrative example, placing the number of fibrous layers on the surface of the inner-mold-line tool having the protrusions that extend from the surface of the inner-mold-line tool comprises: laying-up a first number of layers of the number of fibrous layers over the protrusions; and laying-up a second number of layers of the number of fibrous layers on the inner-mold-line tool, wherein the second number of layers has openings corresponding to the protrusions. The outer-mold-line layer (132) is substantially smooth.

In the illustrative example, the number of fibrous layers comprises a mixture of structural fibers and thermoplastic fibers with or without a binder or a binding agent, wherein the thermoplastic fibers, when melted and consolidated, form a matrix to form the stiffened panel in a form of a thermoplastic panel. In the illustrative example, the structural fibers and the thermoplastic fibers are at least one of discontinuous, stretch-broken, or chopped, wherein a combination of the structural fibers and the thermoplastic fibers form an intimate blend, wherein the structural fibers and the thermoplastic fibers are commingled, wherein the number of fibrous layers is selected from at least one of a unidirectional tape, a woven fabric, a braided fabric, or a non-woven fabric.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for fabricating a stiffened panel, the method comprising:

placing layers of composite material on a surface of an inner-mold-line tool having protrusions that extend from the surface of the inner-mold-line tool;

compacting the layers of composite material laid-up on the surface of the inner-mold-line tool to form compacted layers of composite material;

curing the compacted layers of composite material to form an inner-mold-line layer having corresponding protrusions; and melt-bonding the inner-mold-line layer to an outer-mold-line layer with a bonding tool placed on the inner-mold-line layer that applies a pressure at bond locations between the inner-mold-line layer and the outer-mold-line layer, wherein the bonding tool comprises a plate with protrusions that match depressions in the inner-mold-line layer.

2. The method of claim 1, wherein compacting the layers of composite material laid-up on the surface of the inner-mold-line tool to form compacted layers of composite material comprises:

compacting the layers of composite material laid-up on the surface of the inner-mold-line tool using an intensifier to form compacted layers of composite material, wherein the intensifier has a symmetrical shape of the inner-mold-line tool on which the layers of composite material are laid-up.

3. The method of claim 1, wherein melt-bonding the inner-mold-line layer to the outer-mold-line layer comprises:

bonding the inner-mold-line layer to the outer-mold-line layer using an adhesive.

4. The method of claim 1, wherein placing the layers of composite material on the surface of the inner-mold-line tool having the protrusions that extend from the surface of the inner-mold-line tool comprises:

laying-up a first portion of the layers of composite material over the protrusions; and laying-up a second portion of the layers of composite material on the inner-mold-line tool, wherein the second portion of the layers of composite material has openings corresponding to the protrusions.

5. The method of claim 1, wherein placing the layers of composite material on the surface of the inner-mold-line tool having protrusions that extend from the surface of the inner-mold-line tool comprises:

interleaving continuous plies with doubler plies and protrusion plies.

6. The method of claim 1, wherein the outer-mold-line layer is substantially smooth.

7. The method of claim 1, wherein the stiffened panel is an integrally stiffened thermoplastic panel.

8. The method of claim 1, wherein the composite material comprises a mixture of structural fibers and thermoplastic fibers with or without a binder or a binding agent, wherein the thermoplastic fibers, when melted and consolidated, form a matrix to form the stiffened panel in a form of a thermoplastic panel.

9. The method of claim 1, further comprising infusing the compacted layers of composite material with a thermosetting matrix resin.

10. The method of claim 1, wherein the locations where inner-mold-line layer and outer-mold-line layer contact each other comprise depressions and a surrounding edge of inner-mold-line layer.

11. A method for fabricating a stiffened panel, the method comprising:

placing layers of composite material on a surface of an inner-mold-line tool having protrusions that extend from the surface of the inner-mold-line tool, wherein the layers comprise at least a first layer and a second layer, and wherein the first layer and the second layer have different orientations of the composite material;

compacting the layers of composite material laid-up on the surface of the inner-mold-line tool to form compacted layers of composite material;

curing the compacted layers of composite material to form an inner-mold-line layer having corresponding protrusions; and melt-bonding the inner-mold-line layer to an outer-mold-line layer with a bonding tool placed on the inner-mold-line layer that applies a pressure at bond locations between the inner-mold-line layer and the outer-mold-line layer, wherein the bonding tool comprises a plate with protrusions that match depressions in the inner-mold-line layer.

12. The method of claim 11, wherein compacting the layers of composite material laid-up on the surface of the inner-mold-line tool to form compacted layers of composite material comprises:

compacting the layers of composite material laid-up on the surface of the inner-mold-line tool using an intensifier to form compacted layers of composite material, wherein the intensifier has a symmetrical shape of the inner-mold-line tool on which the layers of composite material are laid-up.

13. The method of claim 11, wherein melt-bonding the inner-mold-line layer to the outer-mold-line layer comprises:

bonding the inner-mold-line layer to the outer-mold-line layer using an adhesive.

14. The method of claim 11, wherein placing the layers of composite material on the surface of the inner-mold-line tool having the protrusions that extend from the surface of the inner-mold-line tool comprises:

laying-up a first portion of the layers of composite material over the protrusions; and laying-up a second portion of the layers of composite material on the inner-mold-line tool, wherein the second portion of the layers of composite material has openings corresponding to the protrusions.

15. The method of claim 11, wherein placing the layers of composite material on the surface of the inner-mold-line tool having protrusions that extend from the surface of the inner-mold-line tool comprises:

interleaving continuous plies with doubler plies and protrusion plies.

16. The method of claim 11, wherein the outer-mold-line layer is substantially smooth.

17. The method of claim 11, wherein the stiffened panel is an integrally stiffened thermoplastic panel.

18. The method of claim 11, wherein the locations where inner-mold-line layer and outer-mold-line layer contact each other comprise depressions and a surrounding edge of inner-mold-line layer.

19. The method of claim 11, further comprising infusing the compacted layers of composite material with a thermosetting matrix resin.

20. The method of claim 11, wherein the composite material comprises a mixture of structural fibers and thermoplastic fibers with or without a binder or a binding agent, wherein the thermoplastic fibers, when melted and consolidated, form a matrix to form the stiffened panel in a form of a thermoplastic panel.

* * * * *